(12) United States Patent
Gil et al.

(10) Patent No.: US 8,055,527 B1
(45) Date of Patent: Nov. 8, 2011

(54) POLICY BASED AUTOMATION FOR A SUPPLY CHAIN

(75) Inventors: Reynaldo Gil, Palo Alto, CA (US); Dipayan Gangopadyay, San Jose, CA (US); Jay Zhou, Fremont, CA (US); Simeon Gordon, Fairburn, GA (US); Sandeep Nayak, Fremont, CA (US)

(73) Assignee: Servigistics, Inc., Atlanta, GA (US)

( * ) Notice: Subject to any disclaimer, the term of this patent is extended or adjusted under 35 U.S.C. 154(b) by 1839 days.

(21) Appl. No.: 10/165,535

(22) Filed: Jun. 7, 2002

Related U.S. Application Data

(60) Provisional application No. 60/297,018, filed on Jun. 8, 2001.

(51) Int. Cl.
*G06Q 10/00* (2006.01)
(52) U.S. Cl. .................................................. 705/7.23
(58) Field of Classification Search .............. 705/7, 8, 705/7.12, 7.23
See application file for complete search history.

(56) References Cited

U.S. PATENT DOCUMENTS

| | | | | |
|---|---|---|---|---|
| 5,710,887 | A | | 1/1998 | Chelliah et al. |
| 5,953,707 | A | * | 9/1999 | Huang et al. ............... 705/10 |
| 6,049,742 | A | * | 4/2000 | Milne et al. ............... 700/99 |
| 6,606,744 | B1 | | 8/2003 | Mikurak .................. 717/174 |
| 7,051,071 | B2 | * | 5/2006 | Stewart et al. ............ 709/204 |
| 7,069,235 | B1 | * | 6/2006 | Postelnik et al. ........... 705/26 |
| 7,206,751 | B2 | * | 4/2007 | Hack et al. ................ 705/7 |
| 7,761,319 | B2 | * | 7/2010 | Gil et al. .................. 705/8 |
| 2002/0052807 | A1 | * | 5/2002 | Han et al. ................ 705/27 |
| 2002/0095322 | A1 | * | 7/2002 | Zarefoss ................... 705/7 |
| 2002/0169658 | A1 | * | 11/2002 | Adler ..................... 705/10 |
| 2002/0188486 | A1 | * | 12/2002 | Gil et al. ................... 705/7 |
| 2002/0188513 | A1 | * | 12/2002 | Gil et al. .................. 705/22 |
| 2004/0210445 | A1 | * | 10/2004 | Veronese et al. ............ 705/1 |

OTHER PUBLICATIONS

Chopra, Sunil; Meindl, Peter; Supply Chain Management: Strategy, Planning, and Operation, Prentice Hall, 2000.*
Buhr, R.J.A., "Use Case Maps for Object-Oriented Systems", Trio Presentation/Workshop, Prentice Hall, 1996.*

(Continued)

*Primary Examiner* — Beth V Boswell
*Assistant Examiner* — Folashade Anderson
(74) *Attorney, Agent, or Firm* — Greenberg Traurig, LLP; David J. Dykeman; Wayne V. Harper

(57) ABSTRACT

A method is provided for implementing a computer network system for managing a supply chain, wherein the computer network system comprising a plurality of application server computers. The method includes: identifying a business context for the supply chain; identifying a set of business policy rules for the business context, the set of business policy rules governing the relationship between two or more entities involved in the supply chain; creating at least one use-case description from the set of business policy rules; creating a plurality of executable code modules corresponding to the use-case description; specifying a plurality of name/value pair for modeling the set of business policy rules; provisioning the plurality of application server computers of the computer network system with the executable code modules; and provisioning a central directory database with the plurality of name/value pairs; whereby the computer network system, in response to one or more events in business transactions between at least two entities involved in the supply chain, is operable to dynamically deliver at least one name/value pair from the central directory database and to execute at least one code module.

14 Claims, 12 Drawing Sheets

OTHER PUBLICATIONS

Regnell, Bjorn; Runeson, Per; "Combining Scenario-based Requirements with Static Verification and Dynamic Testing", REFSQ, 1998.*

"govern." Merriam-Webster Online Dictionary. 2009. Merriam-Webster Online. Oct. 23, 2009 <http://www.merriam-webster.com/dictionary/govern>.*

Yang, J. and Papazoglou, M.P. Interoperation support for e-business. Commun. ACM 43, 6 (Jun. 2000).*

"TMN Overview," TMN—The Telecommunications Management Network by Vertel, 4 pages, http://www.vertel.com/products/tmn.asp, Nov. 12, 2001.

"Management Solutions for IP Networks," Ericcson Review, Nov. 1, 2000, 3 pages, http://www.ericsson.com/about/publications/review/2000_01/article1.

J. Forslöw, et al., "Management Solutions for IP Networks," TMN—Telecom Management Network, Oct. 28, 2001, 12 pages, http://www.ericsson.com/technology/TMN.shtml.

"Embedded Telecommunications Management Network (TMN) Solutions," The International Engineering Consortium, 18 pages, http://www.iec.org.

"Unified Modeling Language FAQ," Rational Software 13 pages, http://www.microgold.com/Stage/UML_FAQ.html, Feb. 5, 2002.

D. Ganguly, "Policy Driven Process Automation," Ganguly & Associates, Feb. 5, 2001, 3 pages.

B. Walder, "Service Level Agreements," The NSS Group, 1991-2001, 8 pages, http://www.nss.brand.co.uk/Articles/March98.html.

"Network Management," Network Knowledge—Network Management Service, 2 pages, http://www.net-know.co.uk/netman/netman.html, Jan. 23, 2003.

"The TMN Model," Network Knowledge—Network Management specialists TMN Model page, 2 pages, http://www.net-know.co.uk/netman/tmn.html, Jan. 23, 2003.

A. Marbus, "OOP and UML," The Code Project, 2000, 16 pages, http://www.codeproject.com/cpp/oopuml.asp.

D. Rosenberg, et al., "Driving Design: The Problem Domain," Software Development, Jan. 2001, 4 pages, http://www.sdmagazine.com/print/.

D. Rosenberg, et al., "Driving Design with Use Cases," Software Development, Dec. 2000, 4 pages, http://www.sdmagazine.com/print/.

D. Rosenberg, et al., "Top Ten Use Case Mistakes," Software Development, Feb. 2001, 6 pages, http://www.sdmagazine.com/print/.

K. Scott, et al., "Successful Robustness Analysis," Software Development, Mar. 2001, 6 pages, http://www.sdmagazine.com/print/.

D. Rosenberg, et al., "Sequence Diagrams: One Step at a Time," Software Development, Apr. 2001, 7 pages, http://www.sdmagazine.com/print/.

* cited by examiner

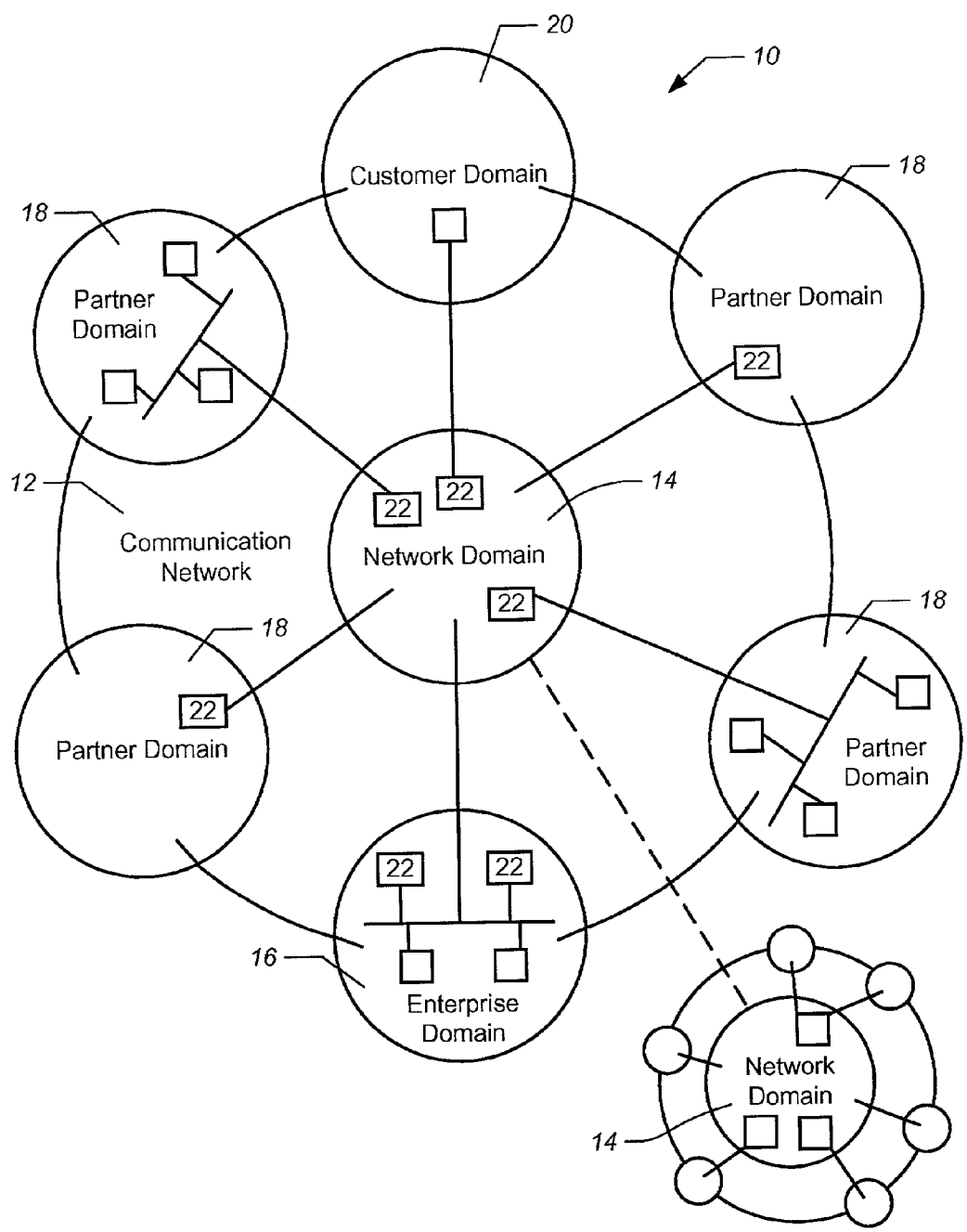
FIG._1

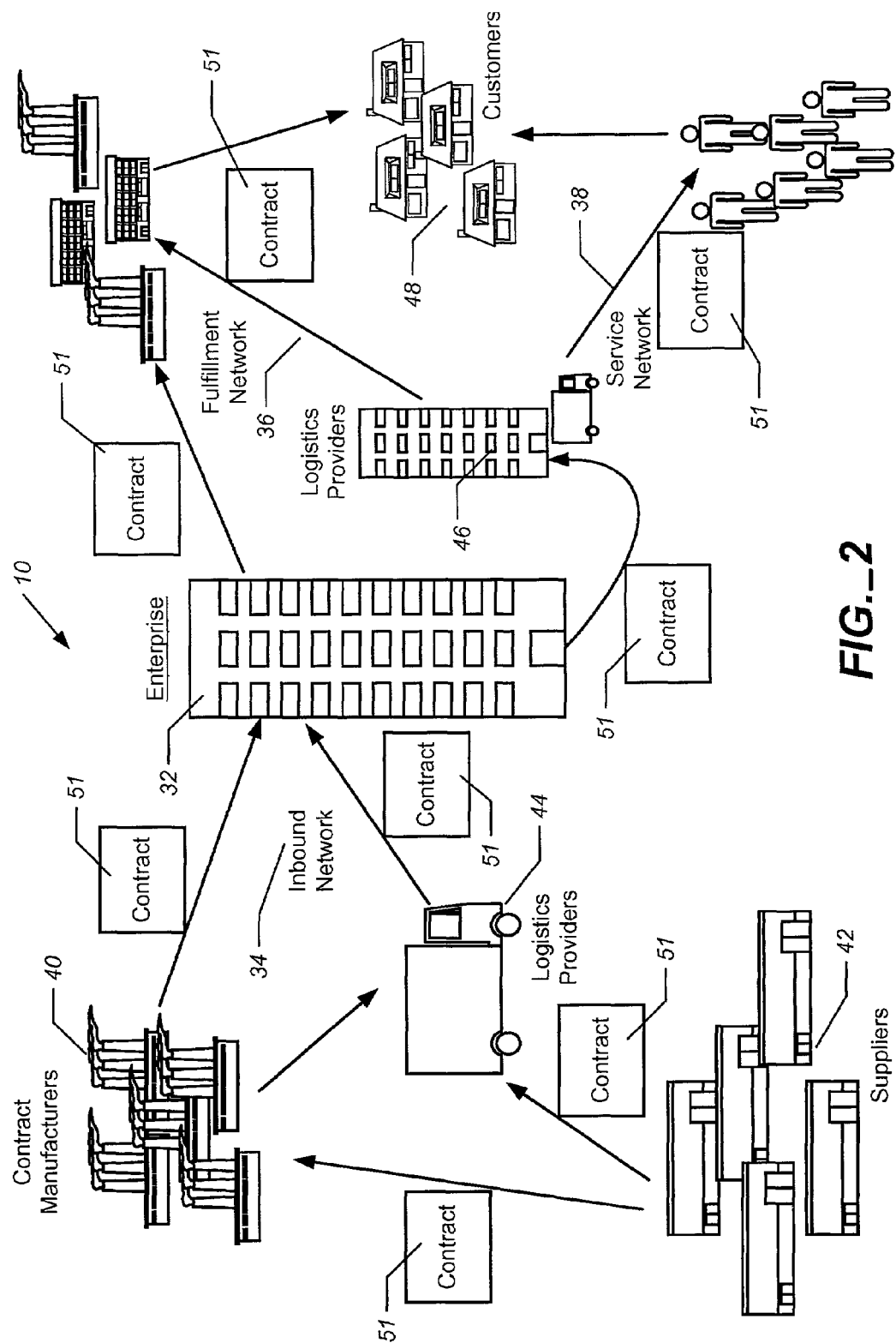
FIG._2

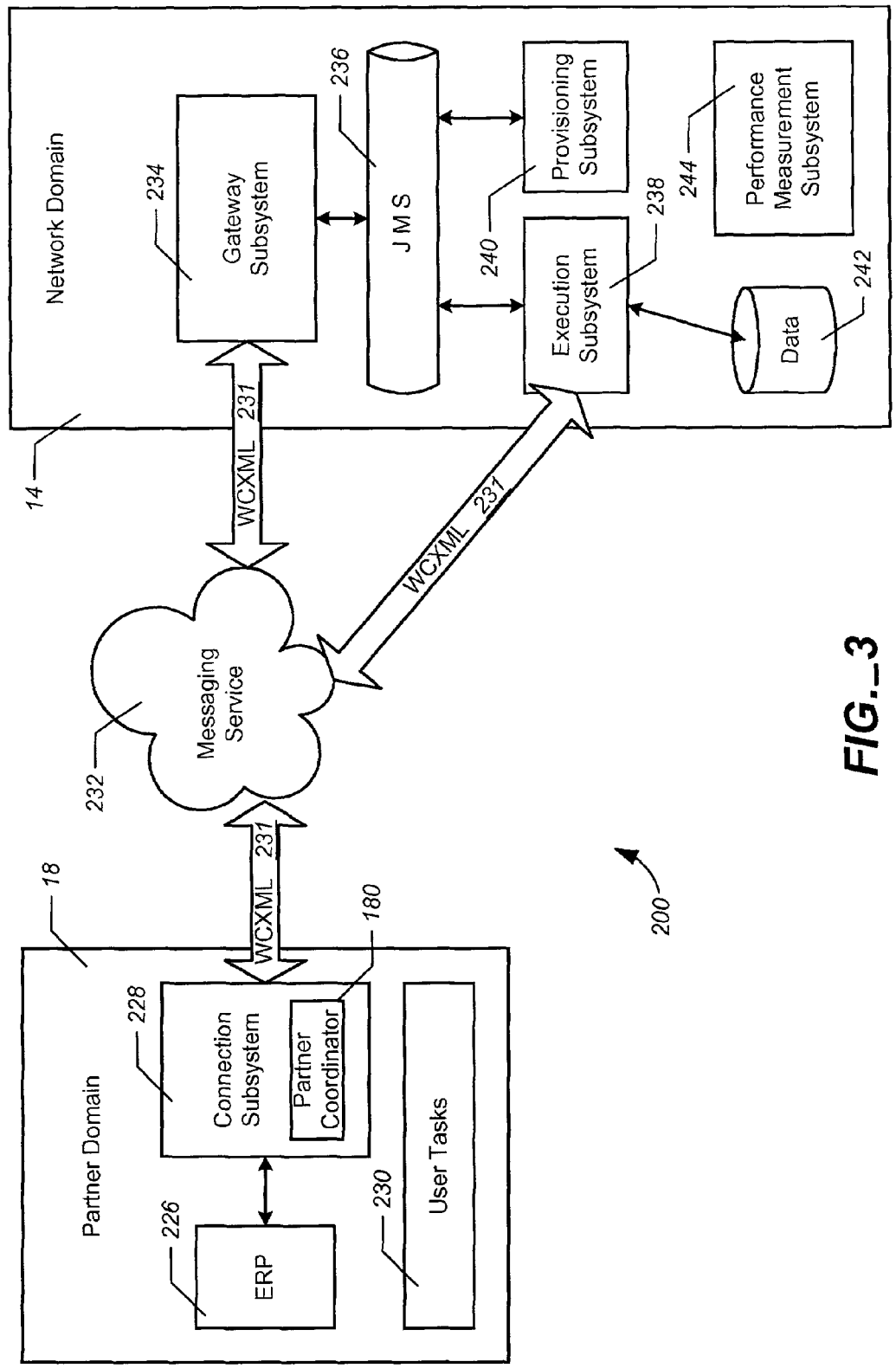
FIG._3

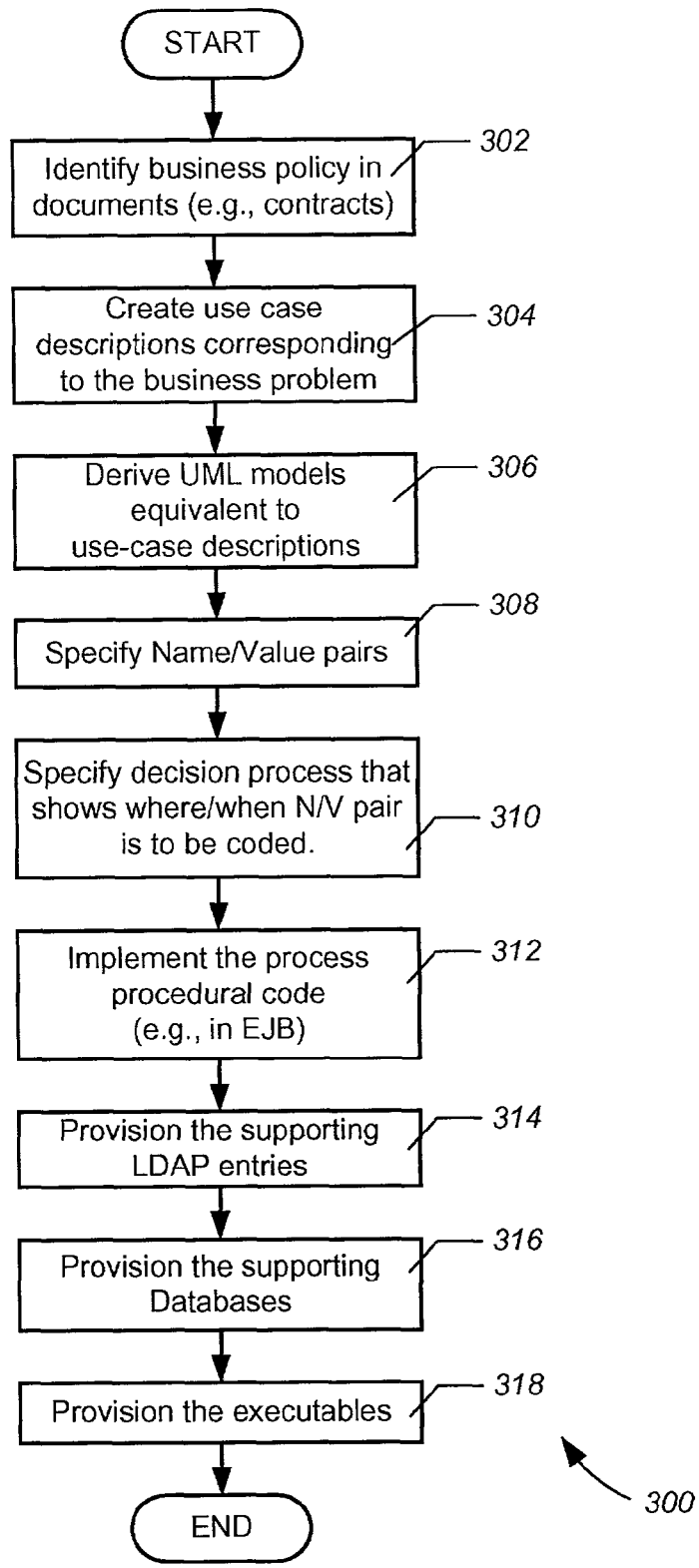
FIG._4

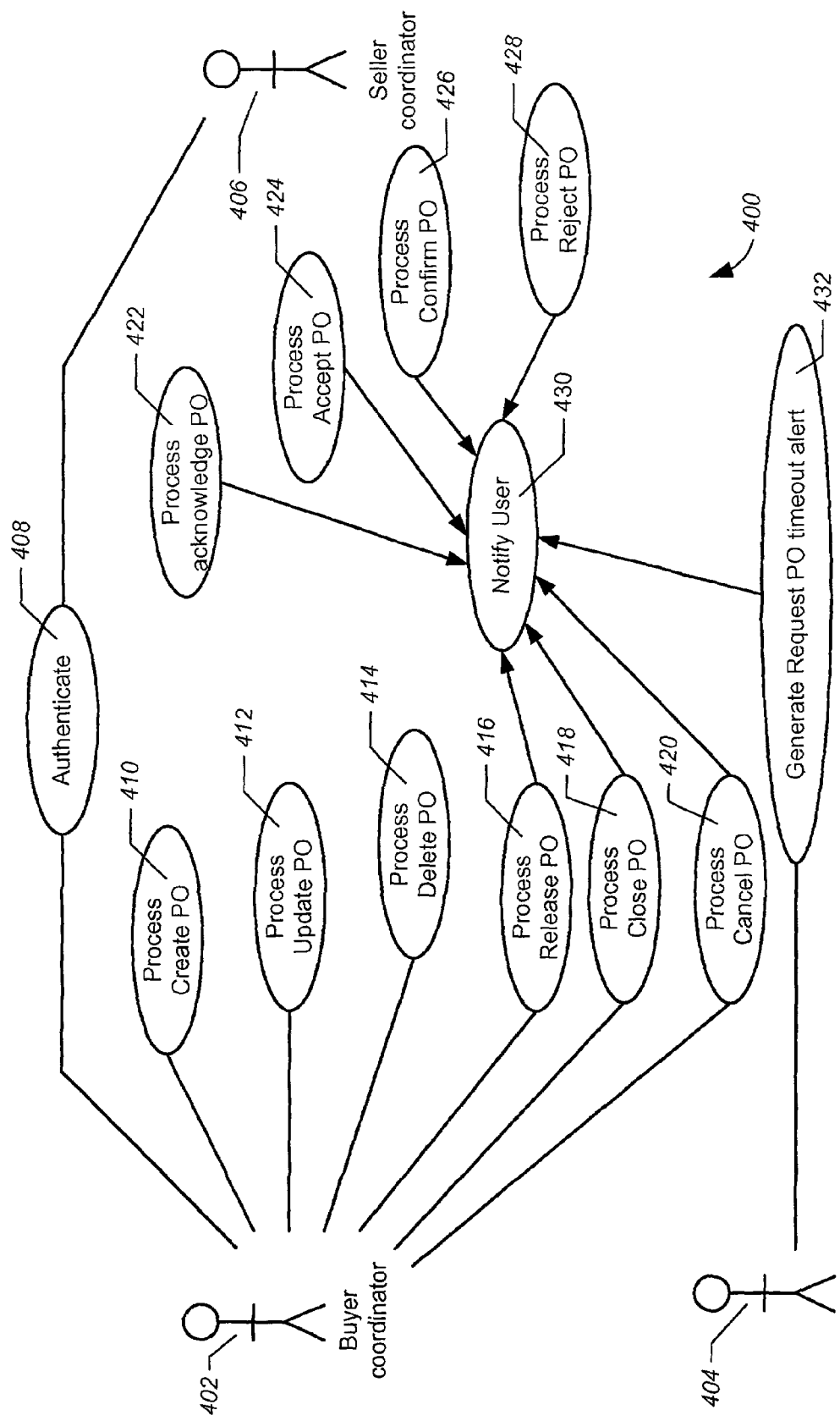
FIG._5

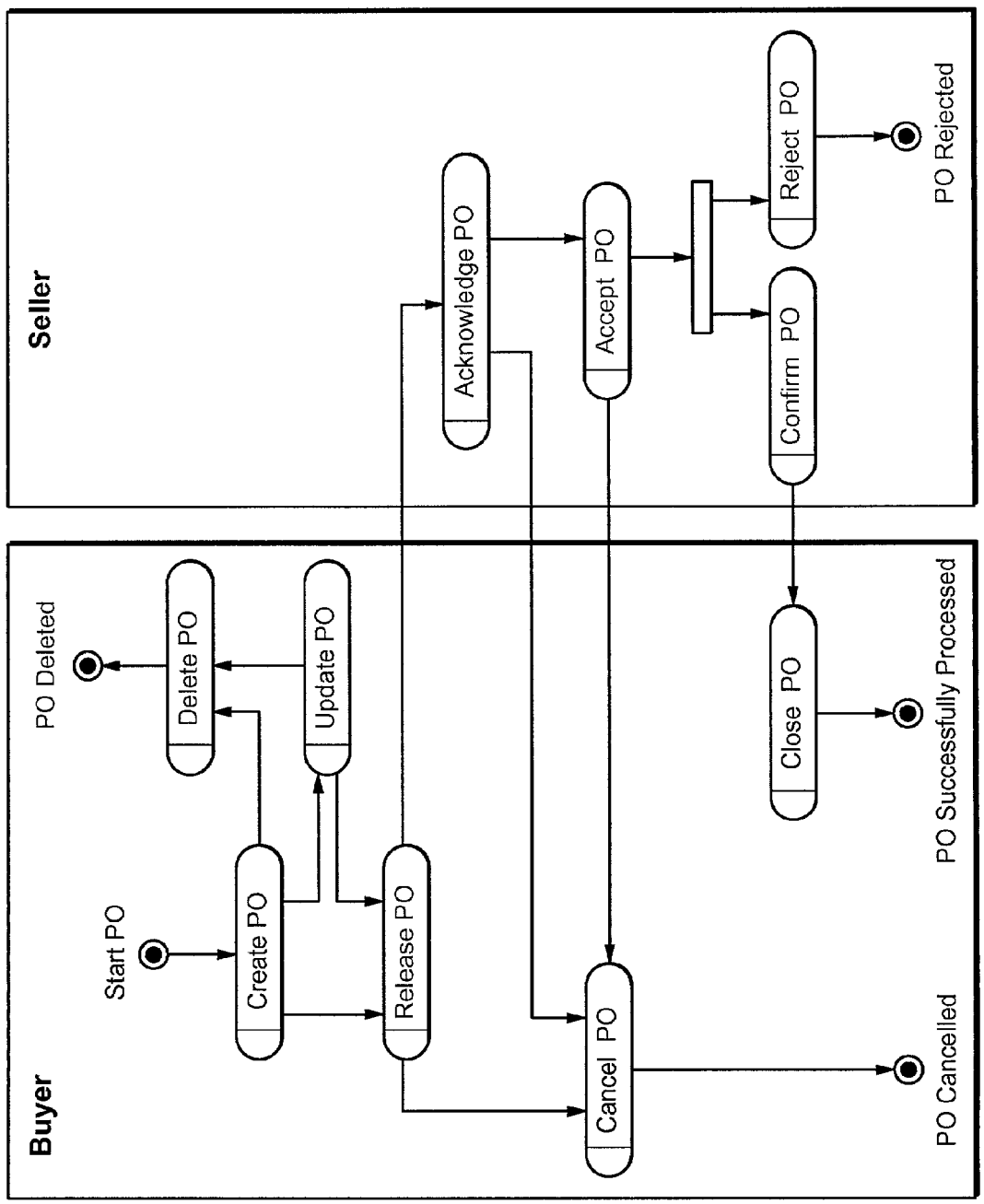
FIG._6

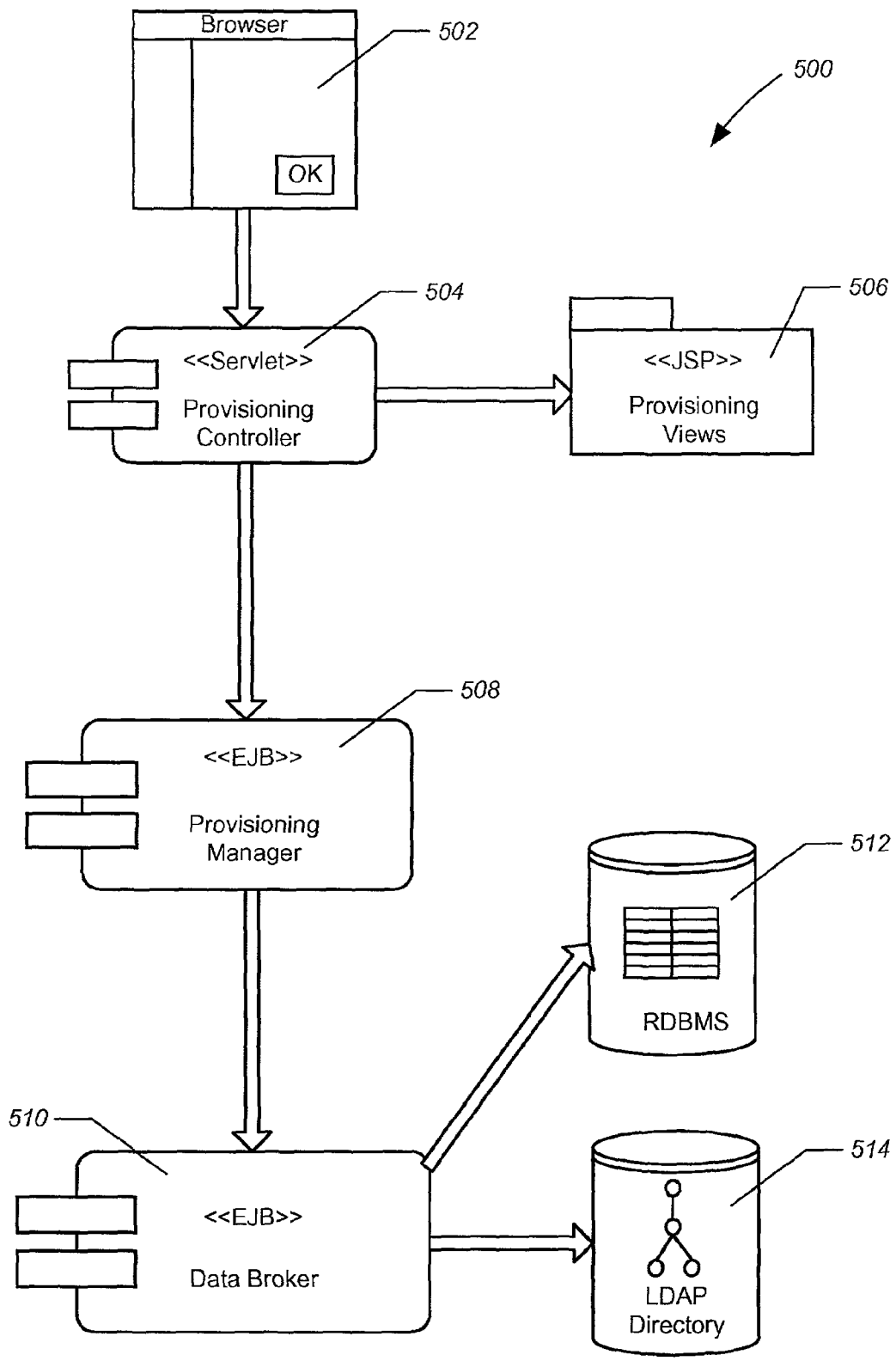
FIG._7

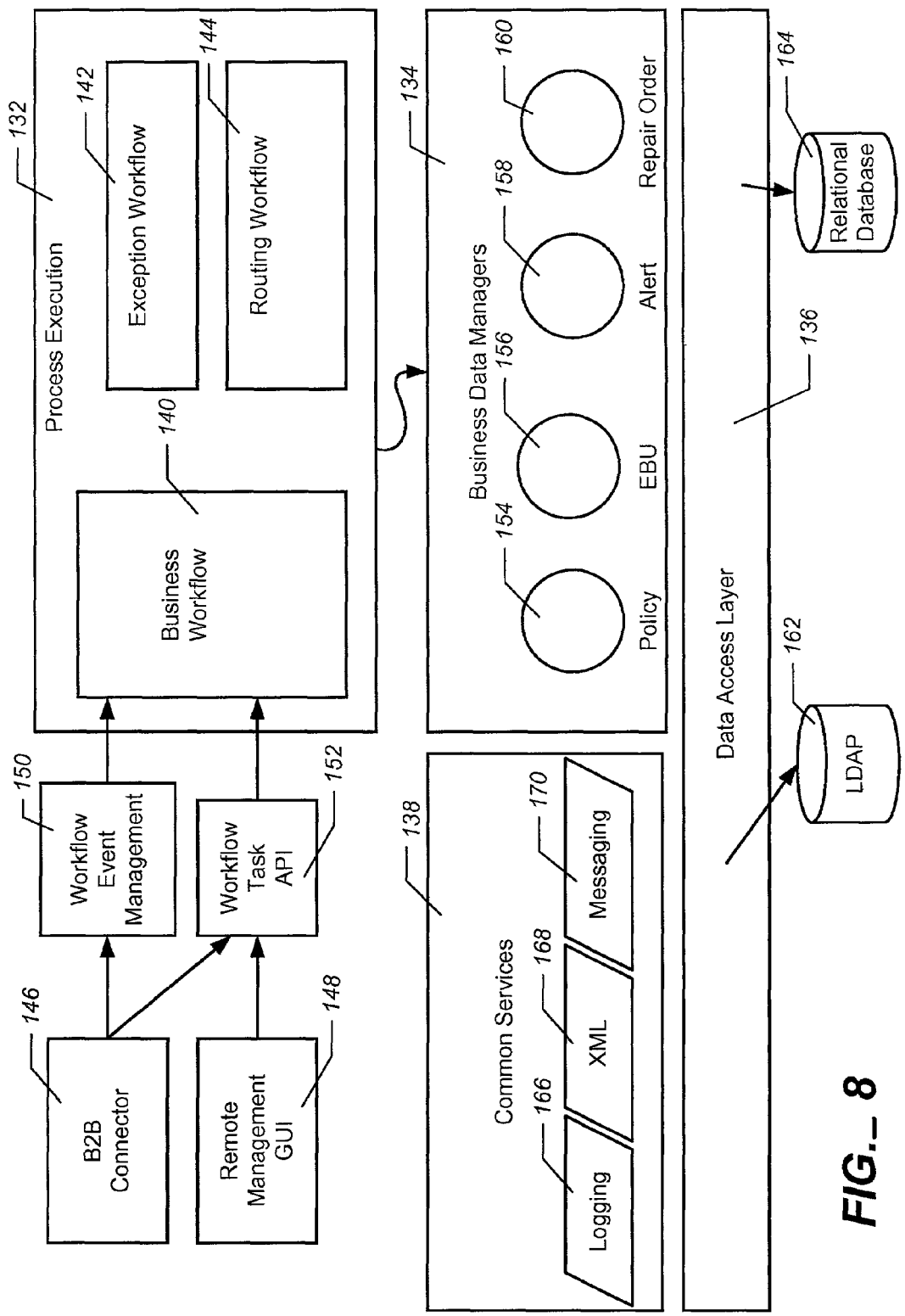
FIG._8

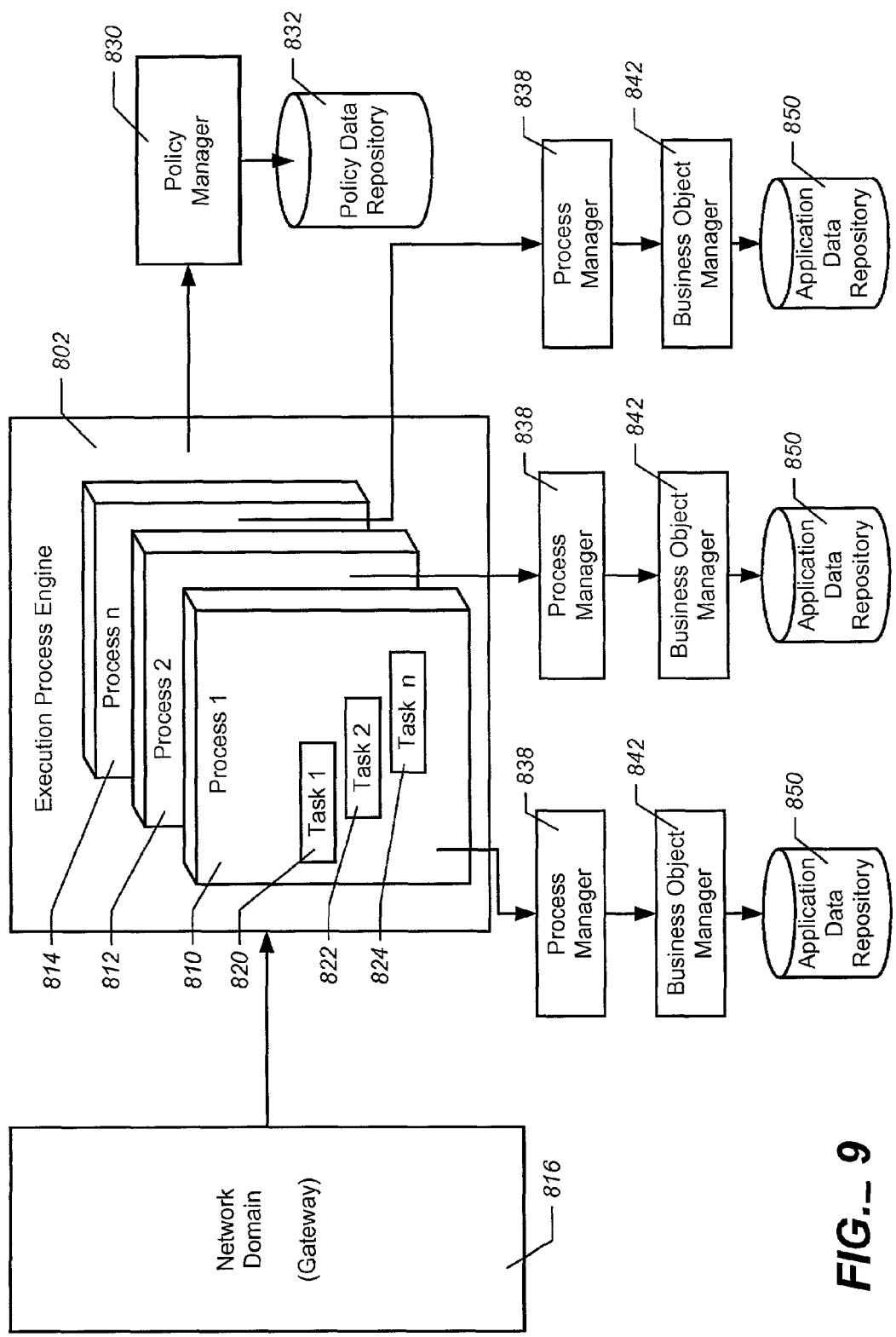
FIG._9

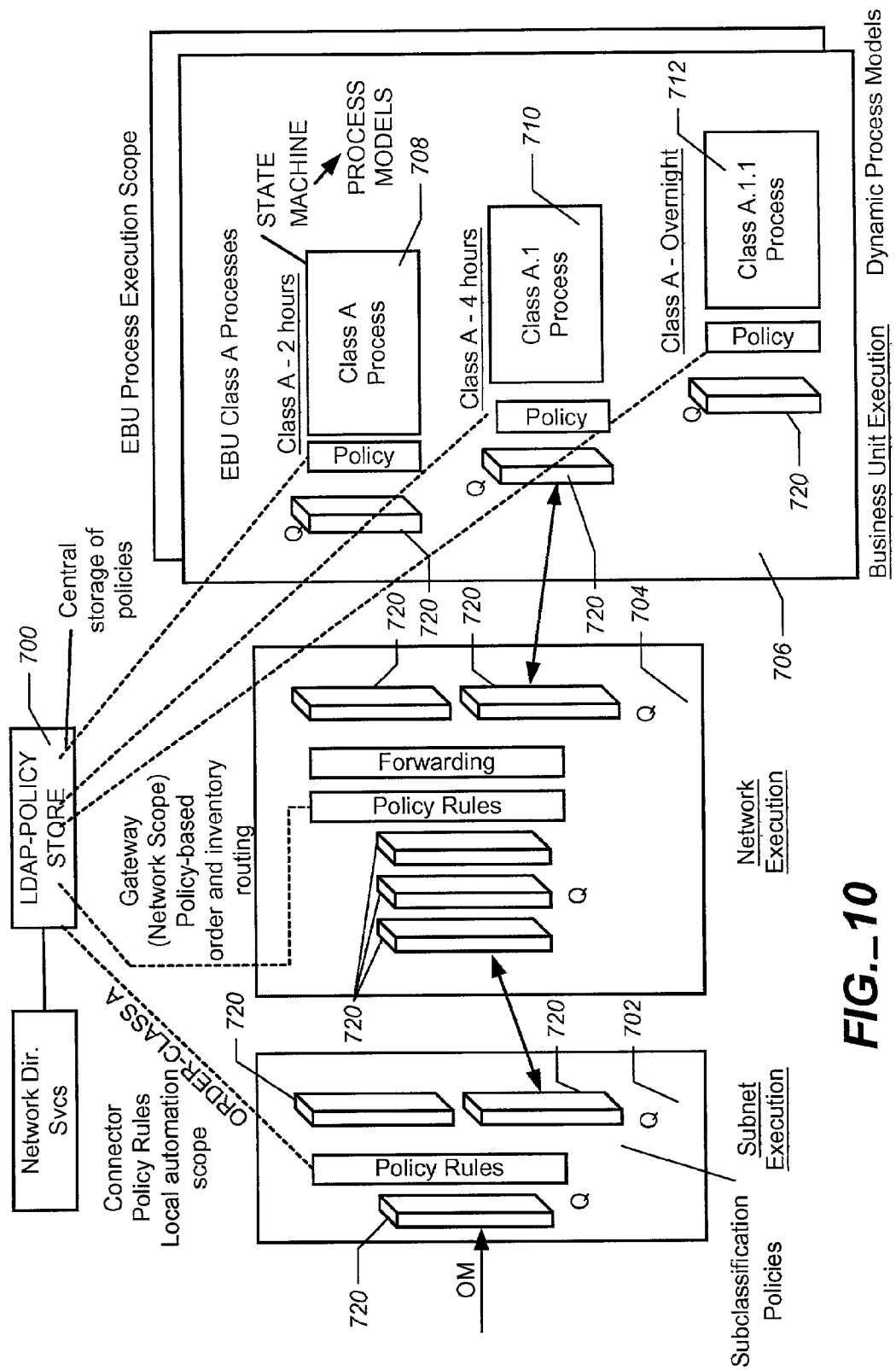
FIG._10

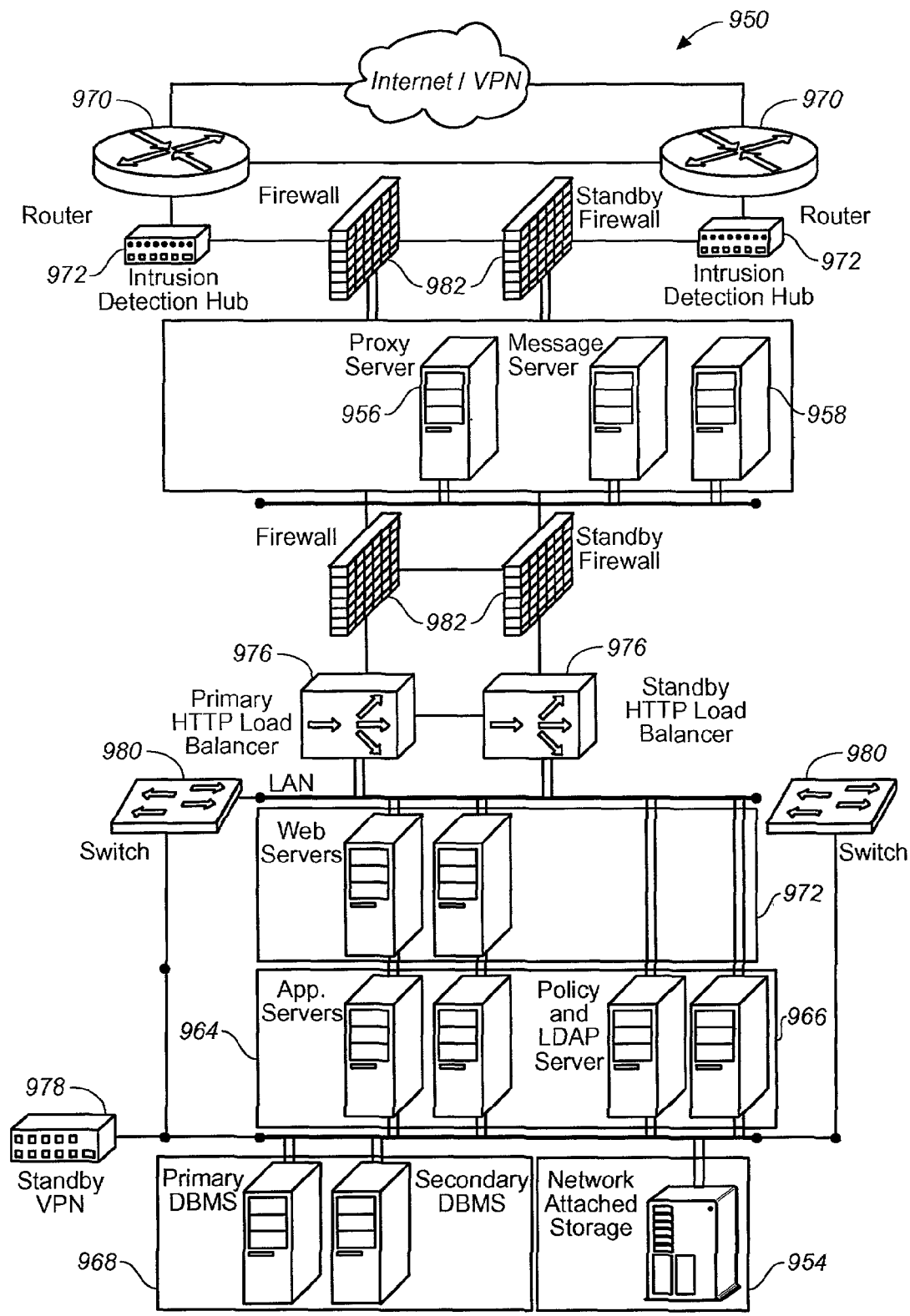
FIG._11

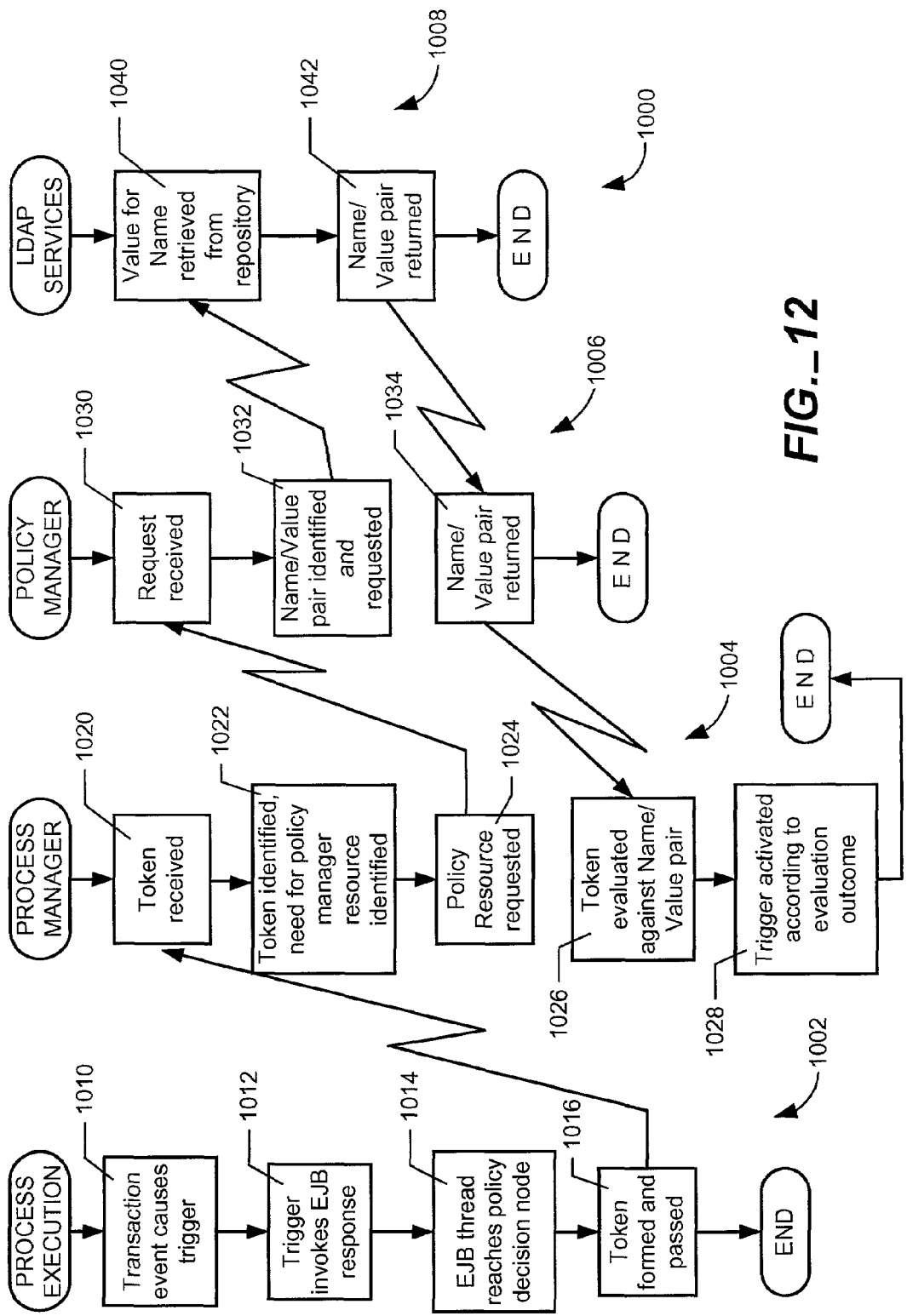
FIG._12

POLICY BASED AUTOMATION FOR A SUPPLY CHAIN

CROSS-REFERENCE TO RELATED APPLICATIONS

This application is a nonprovisional of, and claims the priority of, U.S. Provisional Patent Application Ser. No. 60/297,018 filed on Jun. 8, 2001, entitled "Supply Chain Management," which is assigned to the present Assignee and is incorporated herein by reference. This application is related to co-filed U.S. application Ser. No. 10/165,737, filed on Jun. 7, 2002, entitled, "Separating Decision Logic from Action Logic in a Supply Chain Management System," which is assigned to the present Assignee and incorporated herein by reference in its entirety. This application is also related to U.S. application Ser. No. 10/028,542, filed on Dec. 19, 2001, entitled, "Supply Chain Management" and to U.S. application Ser. No. 10/027,965, also filed on Dec. 19, 2001, entitled, "Reporting in a Supply Chain."

COPYRIGHT AND TRADEMARK NOTICE

A portion of the disclosure of this patent document contains material which is subject to copyright protection. The owner has no objection to the facsimile reproduction by any one of the patent document or the patent disclosure, as it appears in the Patent and Trademark Office patent file or records, but otherwise reserves all copyrights whatsoever. Certain marks referenced herein may be common law or registered trademarks of third parties, affiliated or unaffiliated, with the applicant or the assignee. Use of these marks is by way of example and shall not be construed as descriptive or limit the scope of this invention to material associated only with such marks.

FIELD OF THE INVENTION

The invention relates to the management of supply chains for creating, procuring, and delivering tangible goods. In particular, it relates to policy based automation for a supply chain.

BACKGROUND OF THE INVENTION

Systems and methods for conducting commerce via an electronic means, such as a computer network are commonplace. Some such systems have been used to coordinate entities involved in manufacturing, procuring, distributing, supplying, repairing, and returning products and parts. Previously developed techniques may have been custom tailored to individual commercial activities and are commonly, but not always, oriented towards trade. Previous techniques have also not been adaptable to provide a versatile system capable of supporting a wide range, and, more importantly, a dynamic range of providers of raw materials, goods and, sometimes, related services.

For example, personal computer manufacturers may offer many series of computer models, that can be individually configured with board level, drive level or similar subsystems, each of which may have dozens or thousands of components having multiple layers of assembly and permutation. These components themselves may involve complex supply chains, which must be organized, not merely for production, but also for providing spare parts for servicing, supplies for product development, and ad hoc needs. The requirements for components may continually change as the technology evolves so that parts and models are introduced and obsoleted in quick succession.

A traditional approach to the problem of managing a supply chain is vertical integration. Vertical integration essentially allows in-house service to be supplied with minimal tracking or internal accounting when both "vendor" and "consumer" belong to the same enterprise. Vertical integration, however, is unfeasible for any but the largest enterprises when the product is complex and large volume. Even for giant corporations, it is easy to be overwhelmed by ever growing complexity, expectations and sheer size not to mention an ongoing drive towards more efficiency and accountability of many operational business units.

Moreover, vertically integrated business models are rapidly giving way to outsourcing. Oftentimes, OEMs (original equipment manufacturers) respond to cost and competitive issues by divesting operations and outsourcing key functions, such as manufacturing, distribution, logistics, service, and inventory management. The rationale behind outsourcing is to focus on core competencies, and to transfer responsibility for other activities to service providers who can enjoy, and share, the benefits of their own economies of scale and scope.

Outsourcing has delivered significant financial value (and sometimes, unexpected financial opportunities and/or problems) to both the OEMs and the growing clusters of companies that support them. However, outsourcing, along with globalization and system/application proliferation, has also caused an increase in administrative complexity across supply chains. Responses to such issues have included initiatives for enterprise and collaborative planning across supply chain networks.

Initiatives in outsourcing and collaborative planning have exposed a critical flaw in today's extended supply chains: specifically that they are not configured for efficient execution. Ostensibly, efficient execution is typical for companies that are vertically integrated. Thus, managing a supply chain has become a task of near exponentially growing complexity that enterprise-focused systems cannot adequately support. Furthermore, collaborative planning solutions, though useful, fail to coordinate execution across supply chains.

Computer architectures for online electronic commerce have been developed using, for example, the Internet as a transport mechanism to transmit data representing purchase (and similar) requests between a proprietary browser and server product pair. However, such computer architectures have resulted in further complexity and have failed to adequately address the need for efficiency.

For example, Netscape Communications Corporation uses its Navigator/Netsite World Wide Web (WWW) browser/server pair. A buyer may use a Navigator to select a seller's "Netsite Server" (a form of electronic storefront), which is in turn coupled to ordinary application server computers (back-end subsystems), e.g., a credit server or a member server for collecting demographic information on customers. Such servers may contain representations of business rules that are defined by the seller (but are subject to external constraints). Some of these servers are connected to external third-party services, for example, the credit server may be connected to an external credit card processing network. The actual commerce applications are typically represented as being extensions of the application servers. Such application server computers, or application servers for short, are said to be instantiated in the applications. An outcome of such approaches is that business rules (which may be from the application servers) are bound together with the application logic. Thus, such a system meets required levels of efficiency only at the undesirable cost of inflexibility as to business rules of the participants (typically partners) and is inadequate in the present context.

Wide ranges of verifications may be required for various electronic commerce transactions. For example, verification of a buyer's credit or legal standing to place an order, or verification of a seller's ability to deliver the desired item may be required. Previously developed systems do not readily support diverse and dynamically evolving verification requirements and other implications of local and distant business policies, laws and so on.

In systems where the business policies and rules must be determined in advance, changing them can be inefficient and may create interruptions in service. One prior approach is the use of client-server systems, but this too often leads to a situation of unbounded growth in the complexity of the supply chain operations. This results in a problem of "business logic everywhere" having to be skillfully coordinated for changes—a typical result is inefficiency in operation, inefficiency in changing to accommodate evolving needs and general lack of robustness.

Another previously developed approach involves the use of a distributed inference engine. But such systems may be inefficient. Furthermore, design and implementation of such systems is a highly skilled art and very complex. Moreover in such a system there are serious problems as to proving correctness of actions for audit purposes. Moving away from vertical integration typically increases the need for audit activities.

Commonly, the failure of such systems to be sufficiently flexible is highlighted when there is a need to accommodate a new participant (e.g. supplier, manufacturer or customer) in a supply chain, and the new participant has its own requirements, rules and pre-existing procedures.

Thus, a need exists for effective coordination of execution of business policies across networks even as service and lead-time and other requirements evolve and participants therein come and go.

SUMMARY OF THE INVENTION

In contrast with previously developed implementations, the systems and methods for managing supply chains, according to embodiments of the present invention, avoid inference engines and embedded business procedures and data. Techniques are disclosed wherein there is a clear, and usually physical, separation of decision driving logic, data processing and data/name space associations. Inventive are not only the methods of implementing computer systems, methods and computer products for managing supply chains but also the resultant systems, methods and computer products themselves.

In one aspect, a process is provided for provisioning from one or more business contracts to a technical implementation of a supply chain management system and corresponding methods. Under this process, the supply chain management system and corresponding methods are implemented based upon the actual terms of contract (policies) between the various entities involved in a supply chain. This policy-based approach provides rapid implementation and avoids a technically procedural approach that would require a tedious, involved translation from policy into a static technical procedure.

In another aspect, in a system and method for supply chain management, decision logic is separated from action logic using a framework. The decision logic can be related to one or more business policies that govern conduct between two or more entities in the supply chain. This decision logic can be implemented as one or more name/value pairs embodying the business policies. The action logic is related to tasks or actions that are or should be performed as transactions take place in the supply chain. The action can be implemented as one or more state machines. Because the business policies which are the framework for decision logic are very susceptible to change, this aspect provides an advantage in that the name/value pairs can be readily modified without any need to modify the part of the system implementing the action logic.

According to an embodiment of the present invention, a method is provided for implementing a computer network system for managing a supply chain, wherein the computer network system comprising a plurality of application server computers. The method includes: identifying a business context for the supply chain; identifying a set of business policy rules for the business context, the set of business policy rules governing the relationship between two or more entities involved in the supply chain; creating at least one use-case description from the set of business policy rules; creating a plurality of executable code modules corresponding to the use-case description; specifying a plurality of name/value pair for modeling the set of business policy rules; provisioning the plurality of application server computers of the computer network system with the executable code modules; and provisioning a central directory database with the plurality of name/value pairs; whereby the computer network system, in response to one or more events in business transactions between at least two entities involved in the supply chain, is operable to dynamically deliver at least one name/value pair from the central directory database and to execute at least one code module.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description, taken in conjunction with the accompanying drawings, in which:

FIG. 1 illustrates a network of domains for managing a supply chain.

FIG. 2 shows a network for managing a supply chain.

FIG. 3 illustrates an exemplary implementation environment for policy based automation of a supply chain, according to an embodiment of the present invention.

FIG. 4 is a flow chart of an exemplary method for implementing policy based automation of a supply chain, according to an embodiment of the present invention.

FIG. 5 illustrates an exemplary unified modeling language (UML) model for use-case relationships in a purchase order context.

FIG. 6 illustrates an exemplary state diagram.

FIG. 7 illustrates one embodiment for a provisioning component, according to an embodiment of the invention.

FIG. 8 illustrates a logical representation of a network domain which, when executing, implements business policies, according to an embodiment of the present invention.

FIG. 9 illustrates aspects of network execution, according to an embodiment of the present invention.

FIG. 10 illustrates distribution of policy rules from a lightweight directory access protocol (LDAP) policy store during adaptive execution of a system, according to an embodiment of the present invention.

FIG. 11 illustrates an exemplary hardware implementation for at least a portion of a target system.

FIG. 12 is a flowchart of exemplary, interrelated methods in which business policies are automatically executed for a supply chain, according to an embodiment of the present invention.

DETAILED DESCRIPTION

Turning first to the nomenclature of the specification, the detailed description which follows is represented largely in terms of processes and symbolic representations of operations performed by conventional computer components, such as a local or remote central processing unit (CPU), processor, server, or other suitable processing device associated with a general purpose or specialized computer system, memory storage devices for the processing device, and connected local or remote pixel-oriented display devices. These operations may include the manipulation of data bits by the processing device and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For purposes of this discussion, a process, method, routine, or sub-routine is generally considered to be a sequence of computer-executed steps leading to a desired result. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer system are often referred to in terms such as adding, comparing, moving, searching, or the like, which are often associated with manual operations performed by a human operator. It must be understood that no involvement of the human operator may be necessary, or even desirable, in the present invention. Some of the operations described herein are machine operations performed in conjunction with the human operator or user that interacts with the computer or system.

In addition, it should be understood that the programs, processes, methods, and the like, described herein are but an exemplary implementation of the present invention and are not related, or limited, to any particular computer, system, apparatus, or computer language. Rather, various types of general purpose computing machines or devices may be used with programs constructed in accordance with the teachings described herein. Similarly, it may prove advantageous to construct a specialized apparatus to perform one or more of the method steps described herein by way of dedicated computer systems with hard-wired logic or programs stored in non-volatile memory, such as read-only memory (ROM).

Overview

Business policies establish performance expectations, obligations, and liabilities between various parties, such as, for example, an enterprise and its business partners. Business policies can be outlined in contracts and agreements between two or more parties. These business policies may have been negotiated by the parties, each of which may apply classic business analysis techniques, such as discounted cash flow (DCF) and mean time to serve, mean time between services (MTTS/MTBS) analyses. In addition, policy decisions are useful for manufacturing and distribution issues, such as to near just-in-time (JIT) parts procurement.

According to one aspect of the invention, systems and methods are provided for implementing policy based automation for a supply chain. According to another aspect of the invention, systems and methods are provided for automated execution of business policies in a supply chain. According to yet another aspect, systems and methods are provided for separating decision logic from action logic in an implementation for an automated supply chain management system.

In accordance with some embodiments, an application for supply chain management is decomposed into different application elements. These application elements can include, for example, business policy rules and business processes. The business policy rules may determine or dictate the business decisions to be made. A business policy rule can be embodied in one or more name/value pairs, which can be stored in a centralized directory. The business processes can relate to or encompass actions (tasks), events (which trigger business processes), and decision nodes (branching logic). The actions or tasks may be configured for business policy rules. The business processes may be implemented throughout an implementation for a system for supply chain management. When the system is operated, the name/value pairs for business policy rules may be retrieved from the centralized directory and distributed to appropriate parts of the system implementation. This may be referred to as "adaptive execution" of the application. For example, the business policy rules can be evaluated as part of the decision nodes or branching logic. Because the name/value pairs can be easily changed without programmer/developer support, any system implementation can be readily configured and re-configured to adjust for new or different business policy rules. Accordingly, embodiments of the present invention allow rapid configuration and reusability. This is in contrast to previously developed techniques which involved hard-coded, static implementations that are difficult to change and adapt to new and different relationships.

In some of the disclosed embodiments, purchasing, manufacturing, distribution, selling, servicing, or other business situations are broken down into a set of contexts. Each context may cover a logistical area of commercial activity. For example, there may be a purchase-order (PO) context, a forecasting context, a manufacturing context, a materials resource planning (MRP) context, and so on. These contexts may be translated and documented into one or more inter-relationship diagrammatic forms.

Contexts and diagrammed inter-relationships may be formalized into a systematic encoding or use-case descriptions, for example, using a use-case engine. Once use-case descriptions have been generated, name/value data pairs may be described which, in turn, may lead to a description of a decision process wherein the name/value pairs will be encoded. Such name/value pairs may embody business policies, for example, by including policy values that define limits, parameters and modes of business constraints. System implementation follows wherein data and processing code are collected or derived. In one embodiment, the processing code may be implemented in a variant of the Java programming language.

A process of provisioning may follow. Provisioning may include the providing of data, control programs, database controls, rules, policies and the like. If these items are expressible as scalar or simple data structures, a lightweight directory access protocol (LDAP) may be used for the storage and propagation. It is noted that rules, such as those implementing policies, are scoped with dynamic, configurable branching logic, as opposed to internal programmed static logic as found in previously developed implementations.

In some embodiments of the present invention, systems and methods are provided for the automated administration of terms and policies outlined in contracts, such as, for example, service level agreements (SLAs) between two or more entities in the supply chain.

Embodiments of the present invention and their advantages may be understood by referring to FIGS. 1-12 of the drawings. For simplicity in reference, like numerals are used for like and/or corresponding parts and/or aspects of the various drawings.

Network for Managing a Supply Chain

Referring now to the drawings, FIG. 1 illustrates a network 10 for managing a supply chain. Network 10 provides an environment in which some systems and methods of the present invention may be implemented, run, or executed. FIG. 1 is a high-level representation of a number of domains communicating in a communication network 12, including a network domain 14, one or more enterprise domains 16, one or more partner domains 18, and a customer domain 20. The network 10 allows integration of the one or more partner domains 18 with an enterprise domain 16.

Communication network 12 can include any portion of one or more suitable networks for communicating information or data. For example, such a network can be a telecommunications network or the Internet. The Internet is an interconnection of computer "clients" and "servers" located throughout the world and exchanging information according to Transmission Control Protocol/Internet Protocol (TCP/IP), Internetwork Packet eXchange/Sequence Packet eXchange (IPX/SPX), AppleTalk, or other suitable protocol. The Internet supports the distributed application known as the "World Wide Web." Web servers maintain websites, each comprising one or more web pages at which information is made available for viewing. Each website or web page can be identified by a respective uniform resource locator (URL) and may be supported by documents formatted in any suitable language, such as, for example, hypertext markup language (HTML), extended markup language (XML), or standard generalized markup language (SGML). Clients may locally execute a "web browser" program. A web browser is a computer program that allows the exchange of information with the World Wide Web. Any of a variety of web browsers are available, such as NETSCAPE NAVIGATOR from Netscape Communications Corp., INTERNET EXPLORER from Microsoft Corporation, and others that allow convenient access and navigation of the Internet. Information may be communicated from a web server to a client using a suitable protocol, such as, for example, HyperText Transfer Protocol (HTTP) or File Transfer Protocol (FTP).

A telecommunications network may include telephony and voice services, including plain old telephone service (POTS), digital services, cellular service, wireless service, pager service, etc. The telecommunications network allows communication via a telecommunications line, such as an analog telephone line, a digital T1 line, a digital T3 line, or an OC3 telephony feed. The telecommunications network may include a public switched telephone network (PSTN) and/or a private system (e.g., cellular system) implemented with a number of switches, wire lines, fiber-optic cable, land-based transmission towers, spaced-based satellite transponders, etc. In one embodiment, the telecommunications network may include any other suitable communication system, such as a specialized mobile radio (SMR) system. As such, the telecommunications network may support a variety of communications, including, but not limited to, local telephony, toll (i.e., long distance), and wireless (e.g., analog cellular system, digital cellular system, Personal Communication System (PCS), Cellular Digital Packet Data (CDPD), ARDIS, RAM Mobile Data, Metricom Ricochet, paging, and Enhanced Specialized Mobile Radio (ESMR)). The telecommunications network may utilize various calling protocols (e.g., Inband, Integrated Services Digital Network (ISDN) and Signaling System No. 7 (SS7) call protocols) and other suitable protocols (e.g., Enhanced Throughput Cellular (ETC), Enhanced Cellular Control ($EC^2$), MNP10, MNP10-EC, Throughput Accelerator (TXCEL), Mobile Data Link Protocol, etc.). Transmissions over the telecommunications network may be analog or digital. Transmissions may also include one or more infrared links (e.g., IRDA).

Domains 14, 16, 18, and 20 are part of a supply chain. Each domain corresponds to a particular entity in the supply chain. These entities may include an enterprise, one or more partners who provide services or products to the enterprise, possibly an entity which maintains or operates one or more systems of the network for the enterprise and/or partners, and one or more customers of the enterprise. The enterprise may be a manufacturer of goods, such as an original equipment manufacturer (OEM), or a provider of services to businesses or consumers buying products from OEM companies, such as an electrical utility or a telecommunications company. These companies rely on efficient supply chains both for inbound materials and goods and services. A partner may be a supplier of raw materials or parts, a third party logistics (3PL) vendor such as a warehouse hub, a carrier, or a service provider, a third party maintainer (3PM) such as field service, third party repair center, third party returns handling center, or a third party fulfillment provider such as a distributor. A customer may purchase goods or services from the enterprise. Associated with each domain may be one or more functions that are performed by the respective entity. Each entity may have its own systems (e.g., computer systems) to implement some aspects of the functionality, whereas some entities may lack its own systems to implement some aspects of the functionality.

Furthermore, a network system of network 10 may be implemented at least in part at each of enterprise domain 16, partner domains 18, network domain 14, or customer domain 14 to execute the functionality of the respective domain. One or more subsystems 22 (only some of which are labeled, for clarity) of the network system supports communication with the network domain 14 and each of the enterprise domain 16, a partner domain 18, or the customer domain 20.

The network domain 14 may be linked through a gateway to another network domain 14. For example, one network domain 14 may be associated with a service network, and another network domain 14 may be associated with an inbound or supplier network. The service network may be linked to the supplier network through the respective network domains 14 to route transactions between the networks.

An enterprise operating through the enterprise domain 16, partner domains 18, network domains 14, and customer domain 20 of network 10 manages execution of one or more tasks, processes, events, or actions (e.g., receiving orders, manufacturing products, warehousing products, delivering products, etc.) by the enterprise or its supply chain partners. As such, network 10 facilitates the management of the supply chain by the enterprise.

A more detailed description of the network environment in which the systems and methods according to embodiments present invention may operate is provided in U.S. application Ser. No. 10/027,965 filed on Dec. 19, 2001, entitled "Reporting in a Supply Chain," and U.S. application Ser. No. 10/028,542, filed on Dec. 19, 2001, entitled "Supply Chain Management," both of which assigned to same assignee as the present Application, and the disclosures of which are incorporated herein by reference in their entireties.

FIG. 2 illustrates another view of network 10 for managing a supply chain. As seen in FIG. 2, the supply chain may involve one or more networks, each of which involves a plurality of entities cooperating to achieve or execute related functions in at least one aspect of the supply chain. These networks can be, for example, an inbound network 34, a fulfillment network 36, and a service network 38. The entities of the supply chain may include the enterprise 32 and one or more partners, which can be contract manufacturers 40, suppliers 42, logistics providers 44, 46, other service providers, customers, etc. Some entities may be involved in one network but not another network. Other entities may be involved in multiple networks.

As depicted, the inbound network 34 may involve, for example, manufacturers 40, suppliers 42, and logistics providers 44. Manufacturers 40, suppliers 42, and logistics providers 44 may cooperate to manufacture and deliver products to an enterprise 32. The contract manufacturer 40 may manufacture parts for goods manufactured by the enterprise 32. The supplier 42 may supply raw materials to contract manufacturer 40 and/or the enterprise 32. Logistics providers 44 may be needed to deliver parts, raw materials, or finished goods to the enterprise 32.

The fulfillment network 36 and the service network 38 include various entities which may cooperate with the enterprise 32 in delivering goods and services to customers 48. The fulfillment network 36 may involve, for example, call centers, contract manufacturers, logistics providers, hubs, distributors, wholesalers, or retailers who cooperate to take and fulfill orders from one or more customers. The service network 38 may include, for example, call centers, customer support, field service, repair vendors, or logistics providers who cooperate to provide services (e.g., repair, replacement, warranty, installation, etc.) for one or more customers. Logistics providers 46 may work with the fulfillment network 36 and the service network 38. Logistics providers 46 may include, for example, warehouse providers or delivery service providers.

The various entities in the supply chain may each operate under one or more business policies, which may require, govern, dictate, or otherwise specify the desired or appropriate conduct and actions of the entities in particular situations. For example, for the enterprise 32, one such business policy may specify the minimum quantity of product for a particular order or the warranty replacement of a defective product along with turnaround time for the same. As another example, for a logistic provider 44, a business policy may specify the target times for product delivery after receiving the products to be delivered. Another policy may relate to prices for parts, with schedules for large quantity discounts and/or small quantity surcharges. Yet another exemplary policy can be related to the obsolescence of parts, such as a "last call for orders of production parts" date after which the parts are available only on a more limited basis (e.g., service exchange, repair, or refurbishment). In some instances, the business policies may, at least in part, govern the relationships between one or more entities in the supply chain.

Each entity in the supply chain may have its own business for performing at least some of the functions or tasks for which the entity is responsible. Embodiments of the present invention enable business policy based automation for the supply chain. This may include both systems and methods for implementing the business policies into aspects of the supply chain and systems and methods for automatically executing the business policies throughout the supply chain. Business policies form a foundation for specification and implementation of the supply chain system as discussed below.

At least some of the business policies under which entities of the supply chain operate may be set forth or embodied in one or more contracts 51. For example, each manufacture, transfer, sale, purchase, or delivery of goods or services through any of the various networks 34, 36, 38 can governed by one or more contracts 51. Each contract 51 can be an agreement between two or more entities in the supply chain (such as, enterprise 32 and one of its partners), which is reached after business issues are raised, negotiated, resolved and specified between the relevant entities.

When the operational system is created or implemented, contracts and policies are embodied in executable code (which is configurable), database tables and LDAP repositories as described below.

Implementation Environment

FIG. 3 illustrates an exemplary implementation environment 200 for policy based automation of a supply chain, according to an embodiment of the present invention. In implementation environment 200, one business may interact with another business, for example, in enterprise-to-partner scenario. Referring to FIG. 3, a partner domain 18 is associated with a partner (not shown), and a network domain 14 can be associated with the enterprise or one of its partners.

In the implementation environment 200, a connection subsystem 228 resides within the partner domain 18. Data and information for the transactions may be transferred by a secure transport mechanism, i.e., a messaging service 232 (which can use HyperText Transfer Protocol (HTTP)), between the partner domain 18 and the network domain 14.

A connection subsystem 228 at the partner domain 18 may send and receive messages 231 from the network domain 14 via the messaging service 232. In one embodiment, these messages 231 can be formatted in any suitable markup language, such as, for example, eXtensible Markup Language (XML) or some variant thereof. The connection subsystem 228 may perform partner-specific data manipulation, and may communicate with, for example, enterprise resource planning (ERP) applications or subsystems 226 at the partner. The connection subsystem 228 may comprise a partner coordinator component 180. In one embodiment, such partner coordinator component 180 may have or be accessed by a particular uniform resource locator (URL). The connection subsystem 228 is shown as physically residing in the partner domain 18, but it could also reside in the enterprise domain 16 (FIG. 1) or the network domain 14.

If context-based routing is required, a gateway subsystem 234 in the network domain 14 may send and receive messages 231 from the partner domain 18 via a messaging service 232, which may use HyperText Transfer Protocol (HTTP). The gateway subsystem 234 can be an implementation of a network gateway. The gateway subsystem 234 may route those messages via Java Messaging System (JMS) 236 to other subsystems in the network domain 14, such as, for example, an execution subsystem 236. If context-based routing is not required, messages may be sent directly between the connection subsystem 228 and the execution subsystem 238.

The execution subsystem 238 may provide the process management services for generating requests and evaluating responses related to a transaction. The execution subsystem is shown as part of the network domain 14, but it could also be part of a partner domain 18 or the enterprise domain 16 (FIG. 1). The execution subsystem 238 may also be referred to or implemented as a network execution component.

A performance measurement subsystem 244 functions to monitor the system performance statistics. The performance measurement subsystem 244 may be part of an administration component (not shown). The performance measurement subsystem 244 provides decision support to users, for example, based on graphs and reports. It also can define metrics for the performance (e.g., on-time delivery) of various entities in the supply chain. The performance management subsystem 244 can display the performance statistics in one or more reports on a GUI (graphical user-interface e.g., "dashboard") to facilitate monitoring and management by a user. The reports and dashboards may be metric based. The report statistics can be defined with customized structured query language (SQL) requests.

In one embodiment, the execution subsystem 238 and the performance measurement system 244 may each implement business rules that may be derived from or correspond to the policies of contracts 51 (FIG. 2). For example, the execution subsystem 238 may implement business rules that are associated with a purchase order (PO) context (described herein), and the performance measurement subsystem 244 implements rules to determine whether business deadlines are being met. In one embodiment, one or more business rules are applied whenever events of a transaction event cause triggers (discussed below).

A provisioning subsystem 240 may initialize (i.e. bring to a well-known initial state) the applications in network domain 14 in response to messages from partner domain 18. The provisioning subsystem 240 may provide or support the configuration of the network system for business policy automation. That is, the provisioning subsystem 240 may be used to deploy business rules. It can be part of an administration component (not shown).

In one embodiment, the provisioning subsystem 240 can manage or facilitate the management of partners, agreements, enterprise business units (EBUs), processes, and users. It may set up EBUs, associated relationships, as well as group and user entitlements (e.g., associating users to the appropriate level of security, etc.). It may be also responsible for creating rules and associating those rules to the appropriate processes and tasks that are governed by these policies. Provisioning subsystem 240 may receive requests to manage EBU and partnership activities. It may also service requests from the staff at an EBU to manage contract-related activities.

The provisioning subsystem 240 may support the creation or collection of information and data relating to partners, users, groups, security, and network policy. Prior to a partner coming on-line, this information may be defined by operations and professional services at an enterprise. This information may be stored in an lightweight directory access protocol (LDAP) repository. Thus, for example, when the network system of network domain 14 receives a message from a partner, provisioning subsystem 240 may provide the appropriate uniform resource locator (URL) for the partner coordinator component 180 of that partner, a digital certificate, and other partner-specific information needed to generate a valid request. User information may specify groups that each user belongs to and user policy information. The contracts or agreements between an enterprise and its partners may specify business policy and collections. For each partner, configuration properties may define the specifics for a partner configuration.

In one embodiment, the functionality of gateway subsystem 234, execution subsystem 238, performance measurement subsystem 244, and provisioning subsystem 240 can be performed by any suitable communications hub or router in combination with any one or more suitable processors, such as a main-frame, a file server, a workstation, or other suitable data processing facility supported by memory (either internal or external), running appropriate software, and operating under the control of any suitable operating system (OS), such as MS-DOS, MacINTOSH OS, WINDOWS NT, WINDOWS 95, OS/2, UNIX, LINUX, XENIX, and the like.

A data storage facility 242 can store the data and information received, generated, collected, or used by network domain 14. Data storage facility 242 can be implemented with any one or more suitable storage media, such as random access memory (RAM), disk drives, tape storage, or other suitable volatile and/or non-volatile data storage facility. The data facility 242 may typically be configured as a relational database according to common practice. In one embodiment, data storage facility 242 can maintain a lightweight directory access protocol (LDAP) repository for business policies and rules.

The LDAP repository may function as a central storage facility for representations of business policy rules, from which all parts of a network system (including components physically or logically located at the enterprise domain, the partner domains, the customer domains, or the network domain) may draw for up-to-date information and data. In some embodiments, components of a network system may query or make requests to retrieve this policy rule data and information from the LDAP; in other embodiments, the data and information is actively distributed to relevant components of the network system using a suitable "push" technology. Access to the LDAP repository can be token-based data retrieval through process managers. The LDAP repository can provide or support the administration or management of unified policies for extended supply chain processes. The policies maintained in the LDAP repository can support one or more business process workflows. The LDAP repository may provide storage for service level agreement (SLA) configuration. In addition, the LDAP may be used as to maintain user roles/access right information.

Implementing Policy Based Automation

Typically, business activities occur in specific contexts. Particular tasks in a supply chain, and the people/equipment for performing the same, can be separated or partitioned in areas of specialized expertise. By dividing into somewhat independent operating sectors, such partitioning is effective to limit risk and to reduce time needed to train operational staff. For example, persons processing purchase orders (POs) have little need to understand procedures in return material authorization (RMA). Systems and methods, in accordance with embodiments of the present invention, realize corresponding economies and risk containment by dividing the areas of business activity among contexts. Exemplary contexts include purchase order, forecast, materials resources planning, manufacturing, inventory, shipping, and return materials authorization (RMA) processing. In one embodiment for automated supply chain, there can be separate (and somewhat orthogonal) design and implementation activities for these various contexts. One or more systems for policy based automation for operating a supply chain can be implemented by generating a vertical prototype data processing requirements specification (e.g., software specification) for each context within the supply chain.

FIG. 4 is a flow chart of an exemplary method 300 for implementing policy based automation of a supply chain, according to an embodiment of the present invention. An application for supply chain management can be decomposed into different application elements, such as, for example, business policy rules and business processes. The business policy rules may determine or dictate the business decisions to be made. The business processes can be workflows of one or more tasks to be performed during supply chain management.

A number of contexts are specified and subsystems developed for each system implementation. Method 300 may be considered an overview of a system development approach to be used for each business context. The method 300 is performed for a single context, and may be repeated for multiple contexts. In one embodiment, method 300 may be performed, at least in part, by provisioning subsystem 240 in conjunction with a human user, such as, for example, a system administrator or a developer.

Method 300 begins at step 302 where business policies are identified, for example, from contractual agreements, guarantees, memoranda of understanding, statements of purpose and intent, and the like. One type of contract can be, for example, a service level agreement (SLA). An SLA may include timing policies and comparative policies. A timing policy may specify a time limit for some event; if the event occurs within the time limit, then a first action is taken (main flow triggered). Alternatively if the event does not occur within the period specified in a timing policy, then a second action is taken at the end of the time limit. A comparative policy may set some kind of threshold, typically a value limit. For example a comparative policy may set upper and lower bounds to acceptable values for certain costs or totals of a transaction in trade.

At step 304, one or more use case descriptions are created. Use case descriptions encode each policy relating to the business context. Use case descriptions are understood by those in the relevant arts for the design of software for complex business application systems, and also for GUI (graphical user interface) driven software. A system implementation, according to an embodiment of the present invention, can include complex business application systems and be driven at least in part with a GUI.

A use case represents a particular business process with decision logic and corresponding policy rules. For each context, one or more use cases be identified and diagrammed. An exemplary use case diagram 400 for one particular business context is illustrated in FIG. 5. This use case diagram 400 relates to a purchase order (PO) context. It shows the processes that can be initiated by one or more people who may operate parts of the system to be implemented. That is, a use case diagram shows a set of use cases and actors and the relationships among them. The purchase order context is a relatively simple one from a use case standpoint and is documented here as an example. Similar or different use cases exist for a number of other contexts within a supply chain implementation.

Referring to FIG. 5, the three people involved in this purchase order context are a buyer coordinator 402, a seller coordinator 406 and a PO scheduler 404, which may be representatives for one or more enterprise business units (EBU). The diagrammed cases for the purchase order context of FIG. 5 are as follows: an authenticate use case 408, process create PO use case 410, a process update PO use case 412, a process delete PO use case 414, a process release PO use case 416, a process close PO use case 418, a process cancel PO use case 420, a process acknowledge PO use case 422, a process accept PO use case 424, a process confirm PO use case 426, a process reject PO use case 428, a notify user use case 430, and a generate request PO timeout alert use case 432.

Authenticate use case 408 allows the buyer or seller coordinators to log into and be authenticated by the system. Process create PO use case 410 allows a purchase order to be created, for example, by the buyer coordinator 402. The process update PO use case 412 allows updating of a purchase order that has not been released to the seller. Process release PO use case 416 allows the buyer coordinator 402 to issue a purchase order to a seller. Process delete PO use case 414 allows the buyer coordinator 402 to delete a purchase order that has not yet been released to the seller. Process close PO use case 418 allows the buyer coordinator 402 to close a purchase order. Process cancel PO use case 420 allows a purchase order to be canceled, for example, by the buyer coordinator 402. Process acknowledge PO use case 422 allows the seller coordinator 406 to acknowledge the receipt of a purchase order. Process accept PO use case 424 allows the seller coordinator 406 to indicate the acceptance of a purchase order. Process confirm PO use case 426 allows the seller coordinator 406 to confirm a purchase order. Process reject PO use case 428 allows the seller coordinator 406 to reject a purchase order. Generate Request PO timeout alert use case 432 allows the PO Scheduler 404 to generate an alert when the buyer has not confirmed or rejected the request PO change from the seller in a pre-defined time. Notify user use case 430 allows the user to be notified when the buyer or seller employs one or more of the other use cases described herein. This notification can be provided wireless device, email, pager and/or user interface. Taken together, these illustrate the use case breakdown for a typical PO context.

Use case specifications are mapped onto use case diagrams for the purchase order context as described herein. A use case specification may include a portion, up to all, of the use cases shown in the diagram 400 together, but there may also be many underlying use-cases, which are separated from the diagrammed cases. The use case specification provides details on the purpose of each use-case. A use case specification may also be referred to as a use case description.

An exemplary use case specification is given below as Table 1. Table 1 shows a use case construct for a process create PO use case 410, and illustrates a use of policies for business rules.

TABLE 1

Use Case specification for Process Create PO:

8 Process Create PO
8.1 Description
    This use case allows the Buyer Coordinator or
    the "Create PO" Use Case to create a Purchase Order.
8.2 Primary Actor
    Buyer Coordinator
8.3 Pre-conditions
    Buyer is successfully logged in to the system.
8.4 Post-conditions
    Transaction is added to the Audit Log.
8.5 Trigger
    A new Purchase Order is needed by the user.
8.6 "Included" Use Cases
    Authorize
    Audit Log
8.7 Primary Flow
    Step  Action 1. The use case starts when the system receives a Create PO Message.
2. The system uses "Authorize" Use Case.
3. The system validates:
    company id exists in the WC database
    shipment and billing addresses exist
    part number(s) is valid TABLE 1-continued Use Case specification for Process Create PO:

order quantity is valid (>0)
   part and currency exist and are valid for the line items
   If data is found to be invalid,
   <See Secondary Flow "Data Invalid">.
  4. The system persists the PO. If the PO already exists
   in the database <See Secondary Flow "Already Exists">.
  5. The system sets the state of the PO to "Pre-Released".
   IN HERE?
   Turnaround time TAT (from policy repository) is applied to
   the persisting PO.
  6. The system creates PO CREATE RESPONSE message with
   a completion status "Success".
  7. The system uses "Audit Log" Use Case.
  8. The use case ends.
 8.8 Secondary Flows
 8.8.1 DATA INVALID
  Step Branching Action 3.a If the data is found to be invalid, the system creates PO
   CREATE RESPONSE message with a completion
   status of "Data Invalid".
  3.b Return to step 7 in Primary Flow.
 8.8.2 ALREADY EXISTS
  Step Branching Action 4.a If the PO already exists in the database, the system creates
   a PO CREATE RESPONSE message with a completion
   status of "PO Already Exists".
  4.b Return to step 7 in Primary Flow.
 8.9 Sub Flows
  None
 8.10 Extensions
  None
 8.11 Technology and Data Variations
  Step Variation 1.a Actor can be a Buyer or Seller Coordinator or another
   Use Case.
 8.12 Assumptions
  None
 8.13 Data Entities
  Purchase Order
  (Continued)
  (Continuation)
  Purchase Order Line Item
  Company
  Item Master
  Contact Address
End of Table 1

Referring again to FIG. 4, after use case descriptions have been created for the particular context, then at step 306 a unified modeling language (UML) model or equivalent for the use case descriptions may be derived. In general, UML is a language for specifying, visualizing, constructing, and documenting the artifacts of software systems, and is understood by those of ordinary skill in the art. See, e.g., Rumbaugh, J., Jacobson, I. and Booch, G. *The Unified Modeling Language Reference Guide* (Addison Wesley, 1998). One or more UML models can form a semantically complete abstraction of a system to be implemented. Such models may represent a simplification of the realities of the system.

At step 308, one or more name/value pairs or tagged values are specified for modeling the business policies. Name/value pairs are properties that can be attached to UML model elements. For example, one policy may specify that the turnaround time (TAT) for replacing a particular part should not be greater than 72 hours. This policy can be realized by creating and using a name/value pair of "TAT 72," wherein "TAT" is the name and "72" is the value. The values in a name/value pair can be configurable. Name/value pairs are understood by those of ordinary skill. Name/value pairs may be provided in the form of scalars, tables, or other suitable structures that can be used to implement or embody business policies in the target system.

At step 310, a specification is made as to where and at what point in the process the name/value pairs are to be coded (e.g., when a developer creates process models). This may be carried out as part of the development of decision process executable code. The decision process executable code may embody or implement one or more business workflows or process models, which execute in the system to be implemented. Each process model is defined as or is implemented by a set of tasks. In one embodiment, a process is observable through one or more process traces, which allow various events related to the process to be tracked. Each such process event may be recorded in a database for process trace history. Two processes may communicate via documents, each of which defines the structure of the information to be communicated by some agent.

Some portion of the process executable code may be related to business policies in business contexts. Business policies can govern how to distribute work, such as, for example, repair orders, to a specific enterprise business unit (EBU) from among many potential EBUs. There may also be policies which govern how the work is communicated to the EBU of choice. In addition, policies are defined to govern the relationship between specific transactions. This is used to manage an iteration of the business process and determine the alerts that are generated when a workflow or process violates one or more policies. For instance, if an EBU attempts to replace a particular item, but a policy prohibits replacing such items that are out of warranty, an alert can be generated. A relationship between two EBUs may require many relationship policies. Business policies may also govern access to the system to be implemented and data handled therein. In one embodiment, such policy can be implemented as an access control list (ACL). One or more ACL policies may govern the role of each user in a system.

Business processes or workflows for a system implementation relate to or encompass one or more actions (tasks) which can be carried out in accordance with the implemented system, events which trigger these actions, and conditions (which exist before or after the actions). Events, conditions, and actions can be related to the business policies which are set forth in contracts. For example, one service level agreement between an enterprise and a partner delivery service provider may specify that the partner delivery service provider is required to deliver a product to a customer within 72 hours after it has picked such product up from a third party warehouse provider. The agreement may further specify that if the delivery service provider fails to do so for a particular delivery, the enterprise is not required to pay anything for that delivery.

During development of the system to be implemented, a number of event-condition-action (ECA) items can be generated. Each ECA item embodies a relationship between an event, a condition, and an action. An event can comprise the occurrence of something within the supply chain, such as, for example, the placement of an order by a customer, the delivery of a shipment of product from a partner-vendor to an enterprise, or notification to a partner service provider to send a repair person to a customer for servicing of a machine. A condition can be a pre-condition (what exists before) or a post condition (what exists after) a particular event. An action may be carried out pursuant to an event. One or more actions, which can take place in sequence or in parallel, may be triggered by an event or a condition. For example, in response to the placement of an order at a partner call center, the partner call center may notify the enterprise of the order, which in turn, polls its databases to identify a warehouse facility which is closest to the customer, and then directs the identified warehouse facility to package a product for delivery; at the same time or shortly thereafter, the enterprise may contact one of its partner delivery services to pick up the product from the third party warehouse facility and to deliver to the customer. A number of actions which are related to a particular event or condition may constitute a portion of a workflow (or a business process model).

In the system to be implemented, ECA items may be monitored, controlled, or otherwise managed by one or more applications, such as, for example, a business workflow component (described in more detail below). ECA items may be policy driven, rather than database driven, as with previously developed techniques. As such, ECA items can be associated with business process logic rather than specific data items in a database.

The ECA items may be provided or incorporated in one or more condition-action tables (e.g., "if (condition), then (action)"). These condition-action tables may be used in making decisions during the operation of the implemented system for managing the supply chain. Decision logic for the system may comprise one or more decision nodes (each of which may correspond to a condition of an ECA item) at which a decision should be made. Decision logic is implemented with the name/value pairs. When a decision node is reached in a business process, one or more name/value pairs can be retrieved for making the decision. This provides for a highly configurable system with dynamic execution, because name/value pairs can be changed without shutting down the application, and thus, there is no change in run time even when the system is being, or has been modified. Typically, decision logic is what is most frequently changed in a system implementation (e.g., possibly base on revised or changed business policy).

In the system to be implemented, ECA items may be supported by messages which are exchanged between and within the various domains in the supply chain (e.g., partner domain, enterprise domain) to convey, for example, information pertaining to an event/condition for which action needs to be taken. Some of these messages can formatted in eXtensible Markup Language (XML), or some variant thereof. In one embodiment, each such message include a header and a body. The header may comprise information or data identifying an originator of the message, the intended recipient of the message, and a system agent which generates the message. The header may also include information for credential, digital signature, message type, process type, and process identifier.

In an organizational hierarchy such as a network of enterprise business units (EBUs), one or more condition-action tables can be used as a network routing table. The network routing table makes sure that information pertaining to an event/condition gets to the right EBU for processing/handling. Each EBU may have its defined network node. A network node may invoke one or more policies to govern the routing and delivery of messages.

In one embodiment, one or more state machines are defined or created for handling and managing process flows involving various ECA items. State machines are able to maintain or track execution status or state of a process flow. For example, an action may result in one or more transitions of state within a state machine for a business process. In terms of such an embodiment, a process can be defined as the set of tasks that transition an entity (e.g., the enterprise) from one state to another state. The state transition is governed by state policies. FIG. 6 illustrates an exemplary state diagram 450 for a state machine corresponding to a process flow in the of a purchase order (PO) context. Such state machine includes a number of states for "create PO," "delete PO," "update PO," "release PO," "acknowledge PO," "cancel PO," "accept PO," "close PO," "confirm PO," and "reject PO." In this example, the state machine can be implemented in target systems at a buyer and a seller (which can be an enterprise and one of its partners).

In one embodiment, the state machines are provided with real-time data. The state machines are aware of transactions. State machines can be distributed throughout the implemented system. For example, one or more state machines can be provided, in whole or in part, in an execution subsystem 238 or performance measurement subsystem 244 (see FIG. 3).

In one embodiment, the state machines and the ECA items may implement action logic in the system for managing the supply chain. Action logic relates to the tasks or actions that must be performed once a decision has been made. In another embodiment, a workflow engine (which can be commercially available) can be used for managing state for the action logic.

An advantage of the systems and methods, according to some embodiments of the present invention, includes separating the decision logic of the computer network system for managing a supply chain from the action logic of the computer network system. This is because separating decision logic from action logic in a business process makes the system highly configurable. This is in contrast to previously developed systems and techniques which use hard-coded, static process models at the data level, thus making it difficult to change or modify the systems; indeed, modification of older systems generally required a developer or programmer.

Returning again to FIG. 4, at step 312 each case of the use case specification may be implemented in procedural code, such as, for example, in Java language using Enterprise Java Beans (EJB). At least a portion of this procedural code, when executed, may implement one or more process managers and business object managers. The process managers are invoked by commands and may translate XML data to data objects for processing by the business object managers. Business object managers form the core platform functionality. Process managers and business object managers are described in more detail below.

At step 314, entries are provisioned for a lightweight directory access protocol (LDAP) repository. In one embodiment, the LDAP repository may store or maintain the name/value pairs which embody the various business policies that govern, for example, how to distribute work (e.g., repair orders) to a specific EBU from among many potential EBUs. Thus, policy based automation is supported or provided for managing a supply chain.

Once a name/value pair is created by a developer and stored in the central repository, a user is given the ability (via, e.g., a suitable GUI) to change the value of the pair, thereby allowing ease of configurability for the implemented system. Thus, the implemented system is customizable or extensible because a user can add or modify name/value pairs, for example, to reflect changes in business policies, or to implement additional or different business policies.

At step 316, one or more databases for supporting the business processes are provisioned. Then at step 318, the executables for the system for managing the supply chain are provisioned. Thereafter, method 300 ends.

Steps 302-318 of method 300 may be performed for implementing and provisioning a network system for a given supply chain. It should be understood that these steps are exemplary and, in other embodiments, more, less, or different steps may be performed.

In one embodiment, the implementation method 300 can be performed, at least in part, by a provisioning subsystem 240 (FIG. 3) in conjunction with a human user. FIG. 7 illustrates one embodiment for a provisioning component 500, according to an embodiment of the invention. Provisioning component 500 can be an implementation of provisioning subsystem 240. Provisioning component 500 is responsible for rules creation and associating those rules to the appropriate processes and tasks. Provisioning component 500 can be used for initializing of aspects of applications. Provisioning component 500 sets up on or more enterprise business units (EBUs), associated relationships, as well as group and user entitlement (e.g., associating individual users with the appropriate level security).

The provisioning component 500 may service requests from the EBU staff to manage and organize various activities related to one or more contracts. The activities may include partnership management, agreement management, EBU management, process management, and user management. These management activities may be part of the activity which occurs in supply chain wherein different EBUs cooperate.

Referring to FIG. 7, a system administrator may interact with provisioning component 500 through a graphical web browser type interface 502. The administrator manages EBU and partnership activities using provisioning component 500. A provisioning controller 504 can function to create or modify various resources, such as, for example, business policy name/value pairs, executables that implement event-condition-action (ECA) based procedures, and other resources as described herein. In one embodiment, provisioning controller 504 may be part of the network domain 14.

A provisioning views server 506 may be in communication with provisioning controller 504. Provisioning views server 506 provides insight into the business policy name/value pairs, executables for event-condition-action (ECA) based procedures, etc. that are created or modified with provisioning controller 504. Provisioning views server 506 can be implemented, for example, using JAVA Servlets. JAVA Servlets support the use of Java Server Pages (JSP), which provides for mixing regular, static HTML content with dynamically generated HTML on the server side. This may in turn reflect the dynamic nature of the data being "provisioned."

Provisioning manager 508 organizes the transmission of the resources created or modified by the provisioning controller 504. In particular, provisioning manager 508 may organize the distribution of resources across the network domain to one or more data brokers 510, which are typically physically dispersed. In one embodiment, provisioning manager 508 can be implemented in Enterprise Java Beans (EJB).

Data broker 510 can also be implemented using EJB. Data broker 510 generally functions to coordinate the storage of resources in a LDAP directory 514 or relational database management system (RDBMS) 512 memories in response to commands from provisioning manager 508. In one embodiment, data broker 510 can be implemented in Enterprise Java Beans (EJB).

Provisioning controller 504, provisioning manager 508, and data broker 510 may be implemented in the same or separate hardware.

Provisioning component 500 also provides for the creation of company information (for EBUs) containing partnership information, users, groups, security and network policy. Prior to a partner coming on line, this information is defined using provisioning component 500 by operations and professional services personnel. All this information may be stored in an LDAP 514 or RDBMS policy resource repository 512.

The LDAP 514 may be used as a repository for policy rules related to contractual obligations or trade agreements between or among various entities involved in the supply change to be managed. For example, these contractual obligations can be related to or specified in a service level agreement (SLA) for services provided by humans. An example of such a service could be the repairing of an appliance such as a microwave oven.

Whenever a user logs in through a browser 502, provisioning controller 504 provides the appropriate partner coordinator URL, digital certificate and other partner-specific information needed to generate a valid request. User information set up by the provisioning system includes such entities as a list of groups to which the user belongs, and user policy information. Partnership contracts handled by the provisioning component 500 comprise policy information and collection information. Configuration properties handled by the provisioning component 500 comprise specifics for the partner configuration.

In one embodiment, provisioning component 500 implements a business process modeler. This business process modeler functions to model business tasks, business events, service level agreement (SLA) decisions, and other business related items into one or more processes or workflows which are carried out or managed by the system to be implemented. The business process modeler may design or provide template flows for processes, such as, for example, a process to handle a repair order. In one embodiment, business tasks may be triggered through XML-based messages. SLAs may be supported by automated as well as manual decision nodes. In a supply chain, multiple instances of the same process may be carried out at one time.

In one embodiment, provisioning component 500 may also include a master data coordinator, an ERP broker, and business repository database.

Automated Execution of Business Policies

FIG. 8 illustrates components of a network domain 14, according to an embodiment of the present invention. FIG. 8 provides a logical representation of a system which, when executing, implements business policies. As depicted, network domain 14 comprises a process execution component 132, a business data managers (BDM) component 134, a data access layer component 136, and a common services component 138. One or more transaction messages may enter the network domain 14 via a business-to-business (B2B) connector 146, such as a partner coordinator, alone or in combination with a remote management component 148, such as a web-browser graphical user-interface (GUI). A workflow event management component 150 or a workflow task application programming interface (API) component 152 may route the transaction messages based on the point of origin found in the transaction message header to the appropriate process execution component 132.

The transaction messages that enter process execution component 132 may contain transaction data and corresponding event triggers responsive to actions taken in the network system. Alternatively, the transaction data and associated event trigger may arise out of execution of another transaction including the expiration of a timeout period. The transaction data can be processed or handled pursuant to a workflow which is governed by business policies as set forth in terms of one or more contracts 51 (FIG. 2).

The API component 152 and the event management component 150 provide an interface for external activities to connect to and use the workflow(s) that are driven by the process execution component 132.

The functions of business data manager component 134, data access layer component 136, process execution component 132, common services component 138, workflow event management component 150, and workflow task API 152 can be performed by any suitable computer data processor such as a main-frame, file server, workstation, or etc. The computer data processor may typically operate under the control of any suitable operating system software, such as OS/2®, UNIX®, and/or the like.

The network domain 14 enables control and management of workflows 140, 142, and 144 in the process execution component 132 through access to real-time data. A workflow or process may be initiated by a transaction or a demand, and may execute tasks.

The behavior of processes and tasks are governed at least in part by externally defined policies. For example, a transaction process can be for the delivery of a product, and a policy associated with that process may specify that the product be delivered within two days provided certain criteria are met. As another example, a task can be the handling of a purchase order modification in which the desired quantity is to be changed; an associated policy may set minimum and maximum acceptable values for such a changed quantity.

During the execution of a workflow, the context of a transaction or a demand is maintained by the use of real-time data. Each of workflow 140, 142, and 144 may include triggers that call on common services component 138 or business data managers component 134. The workflows may have triggers that map onto, and are derived during system implementation from, the one or more use-case specifications (described above).

The process execution component 132 is designed to execute objects representing decision nodes, events, and actions (e.g., tasks). The process execution component 132 may include software or applications for business workflow 140, exception workflow 142, and routing workflow 144. The business workflow 140 manages business policies and transactions in network domain 14, for example, by monitoring and controlling various ECA events which are related to the terms of various agreements between and among parties in the supply chain. The exception workflow 142 monitors and manages alerts (inter alia). The routing workflow 144 routes transaction messages throughout the network domain 14, as well as to and from other domains (e.g., partner domains 18, enterprise domain 16, both of FIG. 1).

The business data managers component 134 may manage the processes involving one or more objects which are instantiated pursuant to the transaction messages that flow through network domain 14 and other domains. As depicted, the business data managers component 134 may include a policy manager component 154, an enterprise business unit (EBU) manager component 156, an alert manager component 158, and a repair order manager component 160. The policy manager component 154 maintains the policies and practices specific to an enterprise's way of doing business with a partner, such as an extended EBU. Resources of the policy manager component 154 may be invoked by the business data managers component 134 to ensure that a workflow complies with organizational conditions of one or more entities in the supply chain (e.g., enterprise, partner, etc.). The alert manager component 158 may provide or support alert handling, exception management, and event management capabilities for the actions take (or not taken) by the various entities pursuant to the transaction messages. The repair order manager 160 provides or supports the management of events or transaction messages related to the orders for repair of products provided by the enterprise and/or its partners.

The data access layer component 136 provides access for other components of the network domain 14 to databases, such as LDAP database 162 and relational database 164. The use of the LDAP 162 provides for easy distribution of key information throughout the network 10 for access by network system components. Business policy rules can be implemented or incorporated using a LDAP database 162 or a relational database 164 to allow for separation of decision logic from process (or action) logic. Separation of decision logic from process logic makes system application elements (e.g., process, tasks, and decisions) more configurable to various business conditions. Some elements can be networked and sharable, for example, from LDAP database 162. This mechanism allows for dynamic reconfiguration of business policy rules with distribution throughout the network 10. The business logic in the network 10 dynamically loads policy rules through the use of a policy manager component 154.

The common services component 138 administers or manages areas, such as security, directory, auditing, alert notification, logging 166, eXtensible Markup Language (XML) converting 168, and messaging 170, which can be commonly performed for various transactions. Logging 166 facilitates the auditing of data. XML converting 168 converts or formats messages into XML. Messaging 170 provides secure messaging between components. Security provides authentication, non-repudiation, authorization, and confidentiality services. Directory provides a data flow for platform configuration data and parameters. Alerts provide warnings and errors encountered by the network domain 14 and/or other domains involved with the supply chain.

The common services component 138 and business data managers component 134 may obtain real-time access to data in databases, such as LDAP (lightweight directory access protocol) database 162 and a relational database (for example, an Oracle database, as labeled in FIG. 8) 164, through the data access layer 136. The network domain 14 can then use the real-time data in the databases to control and manage the workflows 140, 142, and 144.

FIG. 9 illustrates aspects of network execution, according to an embodiment of the present invention. In particular, FIG. 9 provides a logical view of one or more instances of various routines, objects, programs, or modules executing on a system. The arrows in FIG. 9 indicate dependency relationships, not necessarily data flows.

Referring to FIG. 9, in network execution, a network domain gateway 816 may receive and convert an XML-formatted message into a JMS-formatted message for handling within a system. The message may be picked off or selected from a JMS queue. The message may contain data or information specifying an event which will trigger one or more actions which can be part of a workflow or process 810, 812, and 814 in an execution process engine 802. In general, the execution process engine 802 facilitates the creation, customization, and monitoring of processes.

Each workflow or process 810, 812, and 814 within the execution process engine 802 may be one of the processes modeled by a business process modeler of a provisioning component 500 (as described above with reference to FIG. 7). These processes can perform specific functions and may be granular in nature. Processes 810, 812, and 814 may be designed to be used in a variety of situations. Thus, for example, the same process may be used as part of an effort to manage exceptions or an effort to calculate interest. Each process 810, 812, and 814 within the execution process engine 802 may have an exception management sub-process (not shown in FIG. 9) to handle exception conditions. Such exception management sub-processes may be part of one or more exception workflows 142 (see FIG. 8).

Each process 810, 812, and 814 may comprise one or more tasks 820, 822, and 824, such as, for example, transforming data according to specified business rules. In one embodiment, there are two categories of tasks within each process: action tasks and policy (or decision) tasks. Action tasks perform specific actions while policy tasks facilitate the interrogation of policy rules. For example, an action task might provide for the creation of a purchase order (PO) responsive to user initiation, whereas a policy task might involve checking a promised turnaround time responsive to reaching a decision node in that action task. A decision node can be a dynamic branch in process logic.

One or more process managers 838 can be invoked by each of the tasks (e.g., 820, 822, and 824) in a process 810, 812, or 814, for example, by being passed a command. The command indicates which process manager 838 should be invoked and the action to be taken. A process manager 838 generally functions to manage at least a portion of a process or workflow. Process managers 838 may, for example, keep track of the events, commands, and actions that have or should occur in the execution of various tasks of a workflow. A process manager 838 may implement actions by using the command pattern, and actions invoked. In one embodiment, each process manager 838 brokers access to a respective business object managers 842, which form the core platform functionality. Process managers 838 may translate XML-formatted data to data objects for processing by the business object managers 842. The process managers 838 may use the business object managers 842 by converting XML content to objects to perform functions, for example, to create and update purchase orders. In one embodiment, process managers 838 can be implemented or executed using stateless session beans.

Business object managers 842 form the core platform functionality. For each process 810, 812, and 814, a respective business object manager 842 may be responsible for servicing requests initiated by the execution process engine 802. For example, if there is a request to create a purchase order, the process 810, 812, or 814 delegates the request to an appropriate business object manager 842 to create the purchase order on the caller's behalf. Business object managers 842 may be abstracted from changes in the process and changes to the XML data structures by the process managers 838. Each business object manager 842 may provide an abstraction layer for database access to an application data repository 850. Business object managers 842 may provide or support the creation and updating of data in the database. Business object managers 842 provide search functionality for the workflows or processes. Like process managers 838, in one embodiment, business object managers 842 can be implemented or executed using stateless session beans.

The policy manager 830 maintains or enforces business policies and related practices that are specific to an entity's (e.g., enterprise's) way of doing business and that are used to ensure that a workflow does not violate organizational conditions. The execution system 802 will call on the policy manager 830 based upon the business processes that are executed in the system. Business policies and the organizational conditions of one or more entities can be stored in a policy data repository 832. Policy data repository 832 may implement a lightweight directory access protocol (LDAP) database.

FIG. 10 illustrates distribution of policy rules from a lightweight directory access protocol (LDAP) policy store 700 during adaptive execution of a system, according to an embodiment of the present invention. As described herein, an LDAP repository may function as a central storage facility for name/value pairs which embody or represent business policy rules. All parts of the network system (including components physically or logically located at the enterprise domain, the partner domains, the customer domains, or the network domain) may draw from the LDAP repository for up-to-date information and data. Thus, the LDAP repository can provide or support the administration or management of unified policy rules for one or more business process workflows throughout the system.

As depicted, in each of a subnet execution 702, a network execution 704, and a business unit execution 706, data and information for policies may be retrieved or distributed from the LDAP policy store 700. In one embodiment, access to the LDAP policy store 700 can be token-based data retrieval. The data/information for policy rules may be in the form of name/value pairs which are used for decision making in the system. Subnet execution 702 may utilize policies for local automation. Network execution 704 may receive or obtain policies relating to, for example, order and inventory routing. Business unit execution 706 may use policies from LDAP policy store 700 during the execution of one or more processes 708, 710, and 712. Each process 708, 710, and 712 may operate under a different policy or set of policies. For example, process 708 may operate under a policy that requires delivery of a particular part within two hours; process 710 may operate under a policy that requires delivery of the part within four hours; and process 712 may operate under a policy that requires delivery overnight. Each process 708, 710, and 712 may be associated with or managed by a respective state machine. Each of subnet execution 702, network execution 704, and business unit execution 706 may comprise one or more queues 720 for queuing messages that may be exchanged throughout the network system.

FIG. 10 illustrates that policy rules in the network system are scoped to where they are executing. That is, the policy rules are dynamically loaded to appropriate areas of the system, and execution and evaluation of rules is scoped to those areas. Thus, policy rules are scoped at different levels (e.g., subnet execution 702, network execution 704, or business unit execution 706).

The scoping of policy rules in the network system allows for centralized administration, but with distributed execution. This provides a technical advantage in that there is greater flexibility in the configuration options, and also greater scalability. In contrast, previously developed systems, which used inference engines, stored and executed rules in one place.

FIG. 11 illustrates a computer-based system 950 which is an exemplary hardware implementation for at least a portion of a target system. Computer-based system 950 may combine off-the-shelf technologies—such as, for example, relational databases, web servers, application servers, Internet technologies—in a unique way to deliver automated execution of business policies in a supply chain. Computer-based system 950 may include redundant network components that provide fail over.

A network infrastructure for computer-based system 950 includes routers 970, intrusion detection hubs 972, and primary HTTP load balancers 976. Multiple border routers provide high reliability. Redundant firewalls 982 are configured as primary and standby. The network may be supported with two levels of firewalls 982: an inner firewall and an outer firewall. The inner firewall, which interfaces between a DMZ and the backend application, allows communication across TCP/SSL and HTTP(s). The outer firewall interfaces between the DMZ and the Internet, a virtual private network (VPN), or other suitable communication network. The outer firewall may allow communication across HTTP(s).

Major software components may be categorized as web services, messaging services, application services, and persistent data services. These software components can be deployed in several layers: a messaging layer, a web services layer, an application server layer, and a database server layer.

The messaging layer, which resides in the DMZ, handles business-to-business input into the computer-based system 950. The messaging layer includes a proxy server 956 and one or more message servers 958. The message servers 958 may receive requests and delegate them directly to the application services layer, thus, bypassing the web services layer. The messaging layer can be clustered.

The web services layer may handle browser-based input into computer-based system 950. It receives requests and delegate them to a policy server 966 (in the application server layer) for authentication or authorization. The request may then be forwarded to a specified application server 964. The web services layer may include one or more web servers 972. Each web server 972 may map directly to an application server 964.

The application server layer provides or supports application services. The application server layer may include one or more application servers 964. This layer also contains policy (e.g., Netegrity) and LDAP servers 966. The policy and LDAP servers 966 may provides data services that are common to all applications.

The database server layer provides fail-over redundancy. As depicted, the database server layer includes primary and secondary database management system (DBMS) servers 968 and network storage 954. Database server layer may utilize a redundant array of independent disks (RAID) protocol to mirror the data. The database repositories may be stored using network attached technology to provide flexibility.

Each of the servers within the three layers can be implemented using any number of suitable server hardware configurations, such as SUN SOLARIS, WINDOWS NT, OS/2 WARP, and NETWARE.

Each component of computer-based system 950 can be configured with multiple NIC cards to provide fail over local area network (LAN) reliability.

Computer-based system 950 may communicate with other systems via a communication network, such as the Internet or VPN. This communication network may be capable of supporting data transfer between a client device and a server device. The communication network may support communication via the Internet, using any suitable protocol, such as, Transmission Control Protocol/Internet Protocol (TCP/IP), Internetwork Packet eXchange/Sequence Packet eXchange (IPX/SPX), or AppleTalk.link.

FIG. 12 is a flow chart for a number of exemplary interrelated, methods 1002, 1004, 1006, and 1008 in which business policies are automatically executed for a supply chain, according to embodiments of the present invention. In one embodiment, methods 1002, 1004, and 1006 may correspond to exemplary executions of process execution 132 (or execution process engine 802), process manager 838, and policy manager 830, respectively, shown and described with reference to FIG. 9.

Methods 1002, 1004, 1006, and 1008 illustrates how components of an implemented system are modeled to execute processes as tasks within the selected open operating environment. Process execution method 1002 handles transactions that may be initiated by some triggering event. At step 1010, the event causes a trigger for the transaction. At step 1012, the trigger invokes a response from a procedure, which in one implementation, can be an execution of an Enterprise JAVA Bean (EJB). When the EJB execution reaches a policy decision node at step 1014, it is triggered to use a policy manager 830 to retrieve the relevant business policy rule. In one embodiment, retrieval of the policy rule is initiated by process execution forming and passing a specific token to a process manager 838.

At step 1020, the process manager 838 receives the token. It then identifies the token and determines the need for a policy manager 830 resource at step 1022. The policy resource is requested at step 1024 from the policy manager 830, which is poised to receive such requests at step 1030. The policy manager 830 identifies the name/value pair(s) from the token and at step 1032 requests the actual values from the LDAP repository 832. The value(s) for the specified name is retrieved from the LDAP repository services 832 at step 1040, and returned to the policy manager 830 at step 1042.

At step 1034, the policy manager 830, in turn, sends the name/value pair(s) to the process manager 838. Process manager 838 at step 1026 evaluates the token criteria against the name/value pairs obtained. Depending upon the result of the evaluation, the appropriate trigger, (selected from one or more alternatives) is activated at step 1028. The new trigger thus formed will invoke an EJB response, thus providing continued asynchronous process execution to fulfill the business operational objectives. Thus, a scoped rule dynamic branching logic is implemented. It can be noted that the various managers (process and policy) may be implemented across various open low level architectures, including different types of network and computer hardware, and therefore, data massaging of various kinds may be present. The value obtained may, for example, be defined in an SLA (service level agreement) and is checked against incoming data that triggered the process execution leading to the policy evaluation. In short, the process execution (which may be Java code in the form of EJB) evaluates the policy, and the evaluation leads the process execution to be triggered to follow the desired specific paths in the execution process. This approach strictly limits complexity at run-time, thereby providing significant advantages over previously developed techniques (e.g., those using inference engines).

By way of further illustration, the following is sample policy in accordance with one embodiment. The sample policy specifies that the turnaround time for a particular part return should not be greater than 72 hours. The "72 hours" is actually a configurable value that is stored in an LDAP repository. In this example the policy is a timer policy. This sample policy is realized as a name value pair, specifically: Name=TAT, Value=72 hours. The execution process engine 802 may have a policy decision node defined therein to evaluate policy whenever it is triggered in accordance with usecase criteria. When the policy rule needs to be examined, the process manager 838 invokes the policy manager 830, with enough information being passed thereto so that the policy manager 830 can identify the policy rule based upon a token. In the present example, the token may be the name of the policy (i.e., "TAT") together with supporting information such as, for example, EBU identification that enables the policy manager 830 to retrieve the appropriate information. Data is retrieved to the process manager 838, which then returns the parameter in a comparable form to the invoking engine. This engine, in turn, evaluates the value against and incoming value and causes the configured execution route to be followed.

As described above, use-case methods are used together with UML diagrams to document business rules to be automated as processes within the network system. The UML guides the creation of policies by human effort. Policies are then decomposed by a human business analyst into meaningful name/value pairs. Policies may be implemented in the target process as either LDAP entities or in the database, the decision as to which being made by a system architect. The actual data population is controlled by LDAP programmers or data modelers as appropriate. Exceptionally, some policies are in the process engine itself and may be realized as name/value pairs stored as XML (extended markup language programs).

As to run-time policy execution, in the exemplary network system, Java language code fetches the provisioned policies from the database or LDAP. EJBs (Enterprise Java Beans) in the process engine may contain the logical algorithms to evaluate the policies and to follow execution paths based upon the results of the process/evaluation.

To facilitate policies a user interface is provided to provision the data for the policy rules. For an LDAP repository, this could be the use of an LDAP browser which allows a system admin to manage the information stored in the LDAP repository. Alternatively, a custom UI (User Interface) may provide a means to update LDAP data.

Although particular embodiments of the present invention have been shown and described, it will be obvious to those skilled in the art that changes and modifications may be made without departing from the present invention in its broader aspects, and therefore, the appended claims are to encompass within their scope all such changes and modifications that fall within the true scope of the present invention.

What is claimed is:

1. A method for implementing a computer network system for managing a supply chain, the computer network system comprising a plurality of application server computers, the method comprising:
dividing areas of business activities into a plurality of business contexts;
identifying a business context for the supply chain from among the plurality of business contexts;
identifying a set of business policy rules for the business context of the supply chain with two or more entities involved in the supply chain;
governing the relationship between two or more entities for said business context of the supply chain in relation to said set of business policy rules;
creating a use-case description from the set of business policy rules;
creating a use-case model of the use-case description using a modeling language comprising a plurality of use-case model elements;
specifying a plurality of name/value pairs that model the set of business policy rules, wherein each of the plurality of name/value pairs is attached to a respective one or more of the plurality of use-case model elements;
creating, using the use-case model and the plurality of name/value pairs, a process specification that specifies a plurality of event-condition-action (ECA) items, wherein each of the plurality of ECA items is associated with a respective one or more of the plurality of name/value pairs;
creating a plurality of executable code modules corresponding to the use-case model and the process specification, each of the plurality of executable code modules comprising procedural code and corresponding to a respective one or more of the plurality of ECA items;
provisioning the plurality of application server computers of the computer network system with the executable code modules; and
provisioning a central directory database with the plurality of name/value pairs;
whereby the computer network system, in response to one or more events in business transactions between at least two entities involved in the supply chain that correspond to one of the plurality of ECA items is operable to dynamically deliver the respective one or more of the plurality of name/value pairs associated with the one of the plurality of ECA items and one of the plurality of executable code modules corresponding to the one of the plurality of ECA items from the central directory database and to execute the one of the plurality of executable code modules.

2. The method of claim 1 wherein the business context is a context selected from the group comprising a purchase order context, a forecast context, a materials resource planning context, a manufacturing context, an inventory context, a shipping context, and a return material authorization (RMA) context.

3. The method of claim 1 wherein the set of business policy rules is derived from a service level agreement, wherein the service level agreement defines an expected level of performance.

4. The method of claim 1 wherein each of the plurality of ECA items is supported by one or more messages exchanged in the computer network system between the two or more entities in the supply chain.

5. The method of claim 4 wherein each message is formatted in extensible Markup Language (XML).

6. The method of claim 1 further comprising creating a state machine for managing a process flow involving at least one ECA item.

7. A method for implementing a computer network system for managing a supply chain, the computer network system comprising a plurality of application server computers, the method comprising:
dividing areas of business activities into a plurality of business contexts;
identifying a business context for the supply chain from among the plurality of business contexts;
governing the relationship between two or more entities for said business context of the supply chain in relation to a set of business policy rules derived from a service level agreement which defines an expected level of performance for the business context of the supply chain with two or more entities involved in the supply chain;
creating a use-case description from the set of business policy rules;
creating a use-case model of the use-case description using a modeling language comprising a plurality of use-case model elements;
specifying a plurality of name/value pairs that model the set of business policy rules, wherein each of the plurality of name/value pairs is attached to a respective one or more of the plurality of use-case model elements;
creating, using the use-case model and the plurality of name/value pairs, a process specification that specifies a plurality of event-condition-action (ECA) items, wherein the plurality of ECA items is associated with a respective one or more of the plurality of name/value pairs;
creating a plurality of executable code modules corresponding to the use-case model and the process specification, each of the plurality of executable code modules comprising procedural code and corresponding to a respective one or more of the plurality of ECA items;

provisioning the plurality of application server computers of the computer network system with the executable code modules; and provisioning a central directory database with the plurality of name/value pairs;

whereby the computer network system, in response to one or more events in business transactions between at least two entities involved in the supply chain that correspond to one of the plurality of ECA items is operable to dynamically deliver the respective one or more of the plurality of name/value pairs associated with the one of the plurality of ECA items and one of the plurality of executable code modules corresponding to the one of the plurality of ECA items from the central directory database and to execute the one of the plurality of executable code modules.

8. The method of claim 7 wherein the business context is a context selected from the group comprising a purchase order context, a forecast context, a materials resource planning context, a manufacturing context, an inventory context, a shipping context, and a return material authorization (RMA) context.

9. The method of claim 7 wherein each of the plurality of ECA items is supported by one or more messages exchanged in the computer network system between the two or more entities in the supply chain.

10. The method of claim 9 wherein each message is formatted in eXtensible Markup Language (XML).

11. The method of claim 7 further comprising creating a state machine for managing a process flow involving at least one ECA item.

12. A method for implementing a computer network system for managing a supply chain, the computer network system comprising a plurality of application server computers, the method comprising:

dividing areas of business activities into a plurality of business contexts;

identifying a business context for the supply chain from among the plurality of business contexts;

identifying a set of business policy rules derived from a service level agreement which defines an expected level of performance for the business context, the set of business policy rules governing the relationship between multiple entities involved in the supply chain;

creating a use-case description from the set of business policy rules;

creating a use-case model of the use-case description using a modeling language comprising a plurality of use-case model elements;

specifying a plurality of name/value pairs that model the set of business policy rules, wherein each of the plurality of name/value pairs is attached to a respective one or more of the plurality of use-case model elements;

creating, using the use-case model and the plurality of name/value pairs, a process specification that specifies a plurality of event-condition-action (ECA) items, wherein each of the plurality of ECA items is associated with a respective one or more of the plurality of name/value pairs;

creating a plurality of executable code modules corresponding to the use-case model and the process specification, each of the plurality of executable code modules comprising procedural code and corresponding to a respective one or more of the plurality of ECA items;

provisioning the plurality of application server computers of the computer network system with the executable code modules; and provisioning a central directory database with the plurality of name/value pairs;

whereby the computer network system, in response to one or more events in business transactions between at least two entities involved in the supply chain that correspond to one of the plurality of ECA items is operable to dynamically deliver the respective one or more of the plurality of name/value pairs associated with the one of the plurality of ECA items and one of the plurality of executable code modules corresponding to the one of the plurality of ECA items from the central directory database and to execute the one of the plurality of executable code modules.

13. The method of claim 12 wherein the business context is a context selected from the group comprising a purchase order context, a forecast context, a materials resource planning context, a manufacturing context, an inventory context, a shipping context, and a return material authorization (RMA) context.

14. The method of claim 12 wherein each message is formatted in eXtensible Markup Language (XML).

* * * * *